United States Patent
Kitze et al.

(10) Patent No.: US 8,898,471 B2
(45) Date of Patent: *Nov. 25, 2014

(54) METHOD AND SYSTEM FOR GENERATING A SECURE MESSAGE AS A URL MESSAGE

(71) Applicant: Unsene, Inc., Incline Village, NV (US)

(72) Inventors: Christopher A. Kitze, Mill Valley, CA (US); Vinh H. Vo, San Jose, CA (US)

(73) Assignee: Unsene, Inc., Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,360

(22) Filed: Nov. 13, 2012

(65) Prior Publication Data

US 2014/0136846 A1    May 15, 2014

(51) Int. Cl.
H04L 29/06    (2006.01)

(52) U.S. Cl.
CPC ............ H04L 63/0428 (2013.01); H04L 63/08 (2013.01)
USPC ........................................... 713/171; 713/151

(58) Field of Classification Search
None
See application file for complete search history.

(56) References Cited

U.S. PATENT DOCUMENTS

| | | | |
|---|---|---|---|
| 7,921,292 B1* | 4/2011 | Pauker et al. | 713/171 |
| 2002/0004902 A1 | 1/2002 | Toh et al. | |
| 2003/0095642 A1* | 5/2003 | Cloutier et al. | 379/88.13 |
| 2003/0101342 A1 | 5/2003 | Hansen | |
| 2005/0033650 A1* | 2/2005 | Robertson | 705/26 |
| 2005/0058260 A1 | 3/2005 | Lasensky et al. | |
| 2009/0047928 A1* | 2/2009 | Utsch et al. | 455/410 |
| 2009/0292462 A1* | 11/2009 | Babetski | 701/201 |
| 2010/0262828 A1* | 10/2010 | Brown et al. | 713/171 |
| 2011/0113109 A1 | 5/2011 | LeVasseur et al. | |

OTHER PUBLICATIONS

Non-Final Office Action for U.S. Appl. No. 13/675,284, mailed Oct. 16, 2013, 26 pages.
Non-Final Office Action for U.S. Appl. No. 13/675,215, mailed Oct. 21, 2013, 30 pages.
Daemen, Joan et al., "The Rijndael Block Cipher," AES Proposal: Rijndael, Version 2, Mar. 9, 1999, pp. 1-45.
Non-Final Office Action for U.S. Appl. No. 13/675,215, mailed Apr. 3, 2014, 11 pages.
Non-Final Office Action for U.S. Appl. No. 13/675,284, mailed Apr. 15, 2014, 13 pages.
Final Office Action for U.S. Appl. No. 13/675,215, mailed Jul. 10, 2014, 12 pages.
Advisory Action for U.S. Appl. No. 13/675,215, mailed Sep. 9, 2014, 3 pages.
Final Office Action for U.S. Appl. No. 13/675,284, mailed Jul. 25, 2014, 14 pages.
Notice of Allowance for U.S. Appl. No. 13/675,284, mailed Oct. 1, 2014, 7 pages.

* cited by examiner

*Primary Examiner* — Benjamin Lanier
(74) *Attorney, Agent, or Firm* — Withrow & Terranova, PLLC

(57) ABSTRACT

A method for generating and delivering a message via a web service is provided. A message for a recipient is converted to a URL and sent. A request is received from a sender to send a message to a recipient. A URL message is created in response to receiving the request to send the message to the recipient and the URL message is sent to the recipient. A URL message response is received from the recipient and a landing message is sent to the recipient in response to receiving the URL message response. The landing message includes a hint requesting an answer from the recipient. An answer is received from the recipient and the message is displayed to the recipient in response to receiving the answer.

22 Claims, 15 Drawing Sheets

METHOD AND SYSTEM FOR GENERATING A SECURE MESSAGE AS A URL MESSAGE

RELATED APPLICATIONS

This application is related to:

U.S. patent application Ser. No. 13/675,215, entitled METHOD AND SYSTEM FOR GENERATING A SECURE MESSAGE AS A URL MESSAGE, which was filed Nov. 13, 2012;

U.S. patent application Ser. No. 13/675,284, entitled METHOD AND SYSTEM FOR GENERATING A SECURE MESSAGE AS A URL MESSAGE, which was filed Nov. 13, 2012.

FIELD OF THE DISCLOSURE

The present invention generally relates to sending secure messages in an open communication environment and more specifically, to sending a secure message as a URL to an intended recipient.

BACKGROUND

In today's computing environments, many users wish to send communications over open communication channels that may be monitored by third parties. In these instances, the third parties may block or intercept messages of a certain type. In order to address the possibility of a third party monitoring communications over open communication channels, methodologies have been devised to establish secure channels over open communication channels. In particular, secure connections over open communication channels are established between two endpoints. Information that travels over the open communication channel via the secure connection is manipulated such that a third party monitoring the open communication channel cannot detect the contents of the information traveling therethrough.

However, in order to establish the secure connection, each of the endpoints must have software installed thereon that allows for the establishment of the secure connection which is problematic for a number of reasons. First, if a sender that has this software wishes to send information via a secure connection to a recipient that does not have the software, the sender cannot send the information over the secure connection. Instead, the sender must use an unsecure connection over the open communication channel. Second, the process of installing the software is problematic in view of the resources that are required for such an installation, such as the cost of the actual software and the time associated with installing the software. Moreover, many users lack the technical ability to install the software.

Accordingly, what is needed is a method for sending a secure message between two endpoints that have disparate security protocols. Moreover, a need exists for a method that allows a sender to send a secure message to a recipient as a non-secure message.

SUMMARY

A method for generating and delivering a secure message via a web service is provided. A secure message for an intended recipient is converted to a URL and sent to the intended recipient. Initially, a secure tunnel is established between a first device and a second device. Examples of the first device include a client device associated with a sender or a webserver. Examples of the second device include a client device associated with an intended recipient. When a user desires to generate a secure message to send to the intended recipient, the user accesses a window, which may either be a window generated at a local client associated with the user or a web browser provided by a webserver. A private security key is generated and the user provides the contents of the secure message. The private security key is used to encrypt and then decrypt the secure message. In addition, the sender provides a hint and an answer to the hint. The hint relates to a fact that is known between the sender and the intended recipient. The answer is a passcode that is used to access the private security key. In an embodiment, the hint is used to generate the private security key. The private security key and the contents of the secure message are stored at a storage location, such as the first device which may be the local client associated with the sender or the webserver. The storage location creates a URL message based on the secure message. The URL message includes a URL and is sent to the intended recipient. The URL directs the intended recipient back to the storage location and indicates to the intended recipient that a message remotely stored from the intended recipient is available to the intended recipient from the sender. The intended recipient engages the URL, and the intended recipient is redirected to the storage location. When the intended recipient is redirected to the storage location, the intended recipient is presented with a landing message that indicates that the intended recipient may pick-up the secure message. The landing message also provides the hint and a field to provide the answer to the hint. The intended recipient provides the answer to the hint and, if the answer is correct, the storage location accesses the private security key and decrypts the secure message using the private security key. The storage location then displays the contents of the secure message at the storage location such that the intended recipient may view contents of the secure message. As noted, a secure tunnel is established between a first device, which may be the storage location, and a second device that is associated with the intended recipient. Thus, the intended recipient views the contents of the secure message via the secure tunnel.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
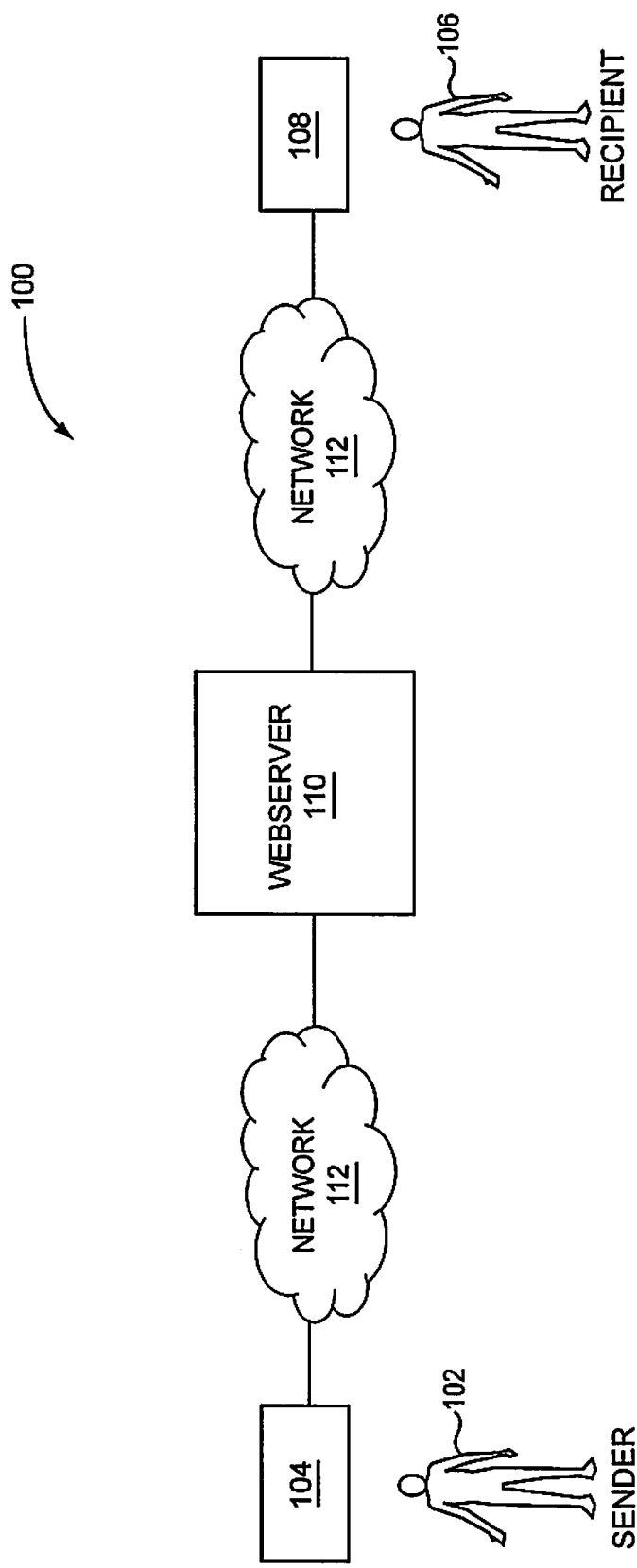
FIG. 1 illustrates an environment in which embodiments of the present invention may operate.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method for generating and delivering a secure message via a web service is provided. A secure message for an intended recipient is converted to a URL and sent to the intended recipient. Initially, a secure tunnel is established between a first device and a second device. Examples of the first device include a client device associated with a sender or a webserver. Examples of the second device include a client device associated with an intended recipient. When a user desires to generate a secure message to send to the intended recipient, the user accesses a window, which may either be a window generated at a local client associated with the user or a web browser provided by a webserver. A private security key is generated and the user provides the contents of the secure message. The private security key is used to encrypt and then decrypt the secure message. In addition, the sender provides a hint and an answer to the hint. The hint relates to a fact that is known between the sender and the intended recipient. The answer is a passcode that is used to access the private security key. In an embodiment, the hint is used to generate the private security key. The private security key and the contents of the secure message are stored at a storage location, such as the first device which may be the local client associated with the sender or the webserver. The storage location creates a URL message based on the secure message. The URL message includes a URL and is sent to the intended recipient. The URL directs the intended recipient back to the storage location and indicates to the intended recipient that a message remotely stored from the intended recipient is available to the intended recipient from the sender. The intended recipient engages the URL, and the intended recipient is redirected to the storage location. When the intended recipient is redirected to the storage location, the intended recipient is presented with a landing message that indicates that the intended recipient may pick-up the secure message. The landing message also provides the hint and a field to provide the answer to the hint. The intended recipient provides the answer to the hint and, if the answer is correct, the storage location accesses the private security key and decrypts the secure message using the private security key. The storage location then displays the contents of the secure message at the storage location such that the intended recipient may view contents of the secure message. As noted, a secure tunnel is established between a first device, which may be the storage location, and a second device that is associated with the intended recipient. Thus, the intended recipient views the contents of the secure message via the secure tunnel.

Turning to the Figures, FIG. 1 illustrates an environment in which embodiments of the present invention may be used. In particular, FIG. 1 illustrates an environment 100 having a sender 102 associated with a client device 104 and an intended recipient 106 associated with a client device 108. Each of the client devices 104 and 108 communicate with a webserver 110 via a network 112. In one embodiment of the present invention, the client devices 104 and 108 and the webserver 110 may be any type of device, such as a computing device, including a work station, a desktop or laptop computer, or a tablet computer. In addition, each of the client devices 104 and 108 and the webserver 110 may be a mobile computing device including, but not limited to, the Apple® iPhone, the Palm Pre, the Samsung Rogue, the Blackberry Storm, and the Apple® iPod Touch® device. However, the client devices 104 and 108 and the webserver 110 are not limited to these devices. It should be noted that while the client devices 104 and 108 are shown communicating with each other via the webserver 110, in other embodiments, the client devices 104 and 108 may communicate directly with one another in a peer-to-peer manner.

In one embodiment of the present invention, the webserver 110 may be a hardware computing device or a software computing device. In addition, while shown as a single hardware device, the webserver 110 may be a plurality of devices distributed at multiple locations. As noted, each of the client devices 104 and 108 communicate with the webserver 110 via the network 112. The network 112 includes the Internet and may operate according to the Bluetooth wireless communication standard, the Zigbee wireless communication standard, the Wireless Fidelity (WiFi) wireless communication standard, or the IEEE 802.11 wireless communication standard. However, the network 112 is not limited to any of these communication standards and may include any other type of communication standard and medium.

In accordance with embodiments of the present invention, the client device 104 may have a first type of security protocol, such as a security protocol in accordance with the AES standard, and the client device 108 may have a second type of security protocol, such as SSL or TLS. However, embodiments of the present invention envision any type of encryption for use as a security protocol. Moreover, in some embodiments of the present invention, the client devices 104 and 108 may use the same type of security. As will be detailed further below, embodiments of the present invention allow the sender 102 to send a secure message to the intended recipient 106 via the network 112 where the client devices 104 and 108 have different security protocols. In an embodiment, the secure message is an encrypted message originating from the sender, where the intended recipient receives notification of the secure message as a URL message. This process is further described with reference to FIGS. 2A and 2B.

Figure 2A:
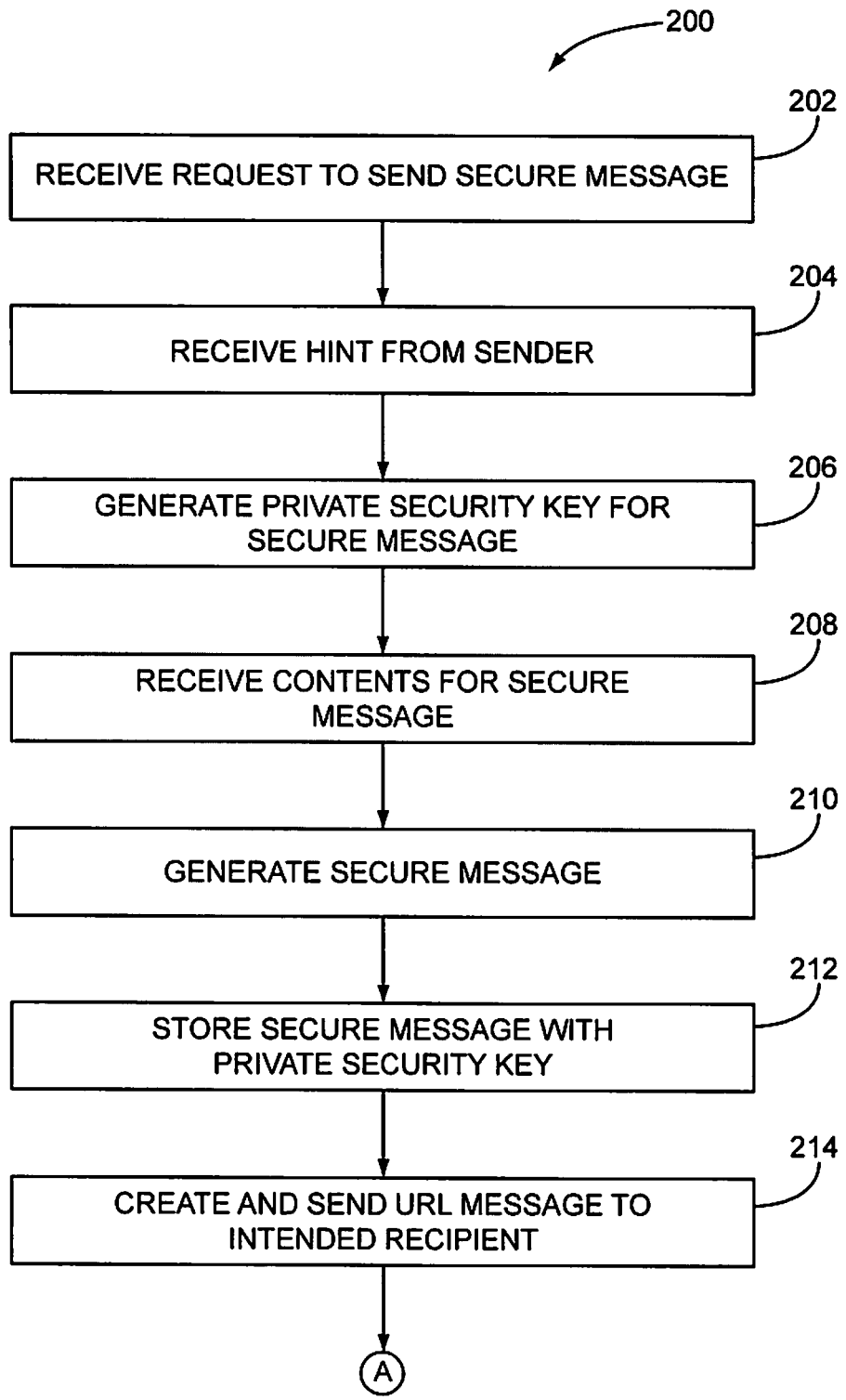
FIGS. 2A and 2B are flowcharts that illustrate a method for providing a secure message to an intended recipient as a URL message.
Figure 2B:
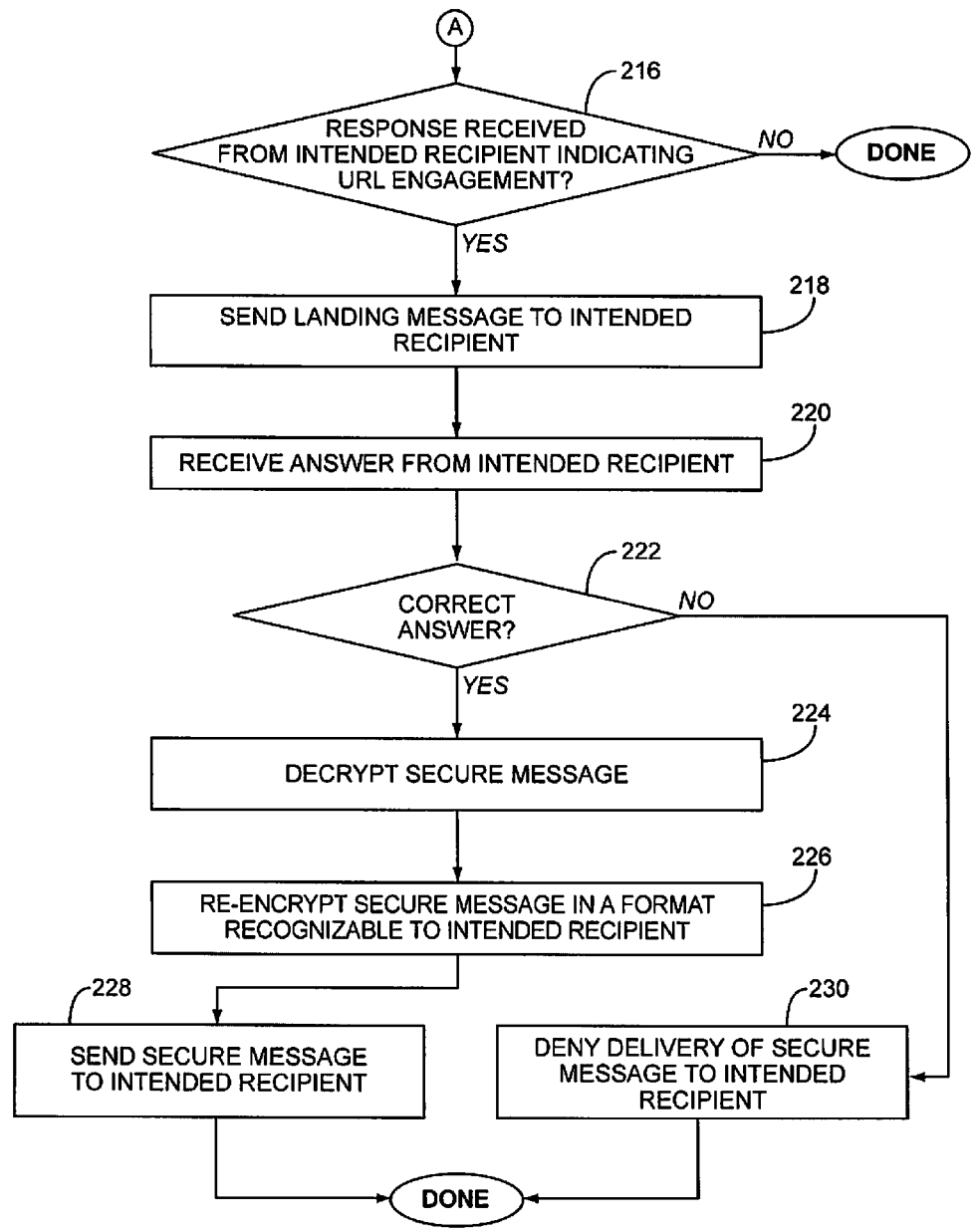

FIGS. 2A and 2B are flowcharts that illustrate a method 200 for providing a secure message originating from a sender to an intended recipient as a URL message in accordance with an embodiment of the present invention. It should be noted that the method 200 may be implemented on any computing device. Initially, in an operation 202, a request is received to send a secure message to an intended recipient that originates from a sender. In one embodiment, the sender may access a window on the client device associated with the sender, such as the client device 104 that is associated with the sender 102, and create the request to send the secure message. In this embodiment, the client device 104 receives the request to send a secure message. In an alternative embodiment, the sender may access a web page of a webserver, such as the webserver 110, and create the request to send the secure message using the web page. In this embodiment, the user may create an account with an entity associated with the webserver using any well known means and then access this account when desiring to create and send a secure message. In this embodiment, the webserver receives the request to send the secure message.

Continuing with FIG. 2A, upon receiving the request to send a secure message to an intended recipient, a hint is received from the sender that may be used to generate a passcode to access the private security key for decryption of the secure message in an operation 204. In an embodiment of the present invention, the private security key is accessed with a passcode where the passcode is received from the intended recipient. In this embodiment, the hint is used to assist in procuring the passcode. The hint may include images, videos, audio and text data, an emblem or the like. The hint relates to a fact that is known between the sender and the intended recipient. For example, the sender and the intended recipient may be business associates and the hint may relate to the name of a business deal the sender and the intended recipient were previously engaged in. Another example relates to a scenario where the sender and the intended recipient are friends and the hint relates to a restaurant at which the sender and the intended recipient previously dined. A further example may be where the sender and the intended recipient are siblings and the hint relates to a vacation destination at which the sender and the intended recipient vacationed. Thus, in an embodiment, the hint and the answer associated with the hint relate to information between the sender and the intended recipient that is publicly unavailable. It should be noted that the possibilities for the hint are limitless and relate to a relationship between the sender and the intended recipient and a fact of this relationship between the sender and the intended recipient.

In an embodiment of the present invention, a question may be generated that is associated with the hint. In this embodiment, the answer to the hint is the passcode that is used to access the private security key and decrypt the secure message. In the scenario above where the sender and the intended recipient are friends, the hint may be the question "What restaurant did we dine at on Oct. 24, 2010?" In this example, the answer is "Sullivan's Steakhouse." Here, the answer "Sullivan's Steakhouse" functions as the passcode for accessing the private security key and decrypting the secure message.

In some embodiments, a client device, such as the client device 104, receives the hint that may be used to decrypt the secure message encrypted with the private security key in the operation 204. In alternative embodiments, a webserver, such as the webserver 110, receives the hint that may be used to decrypt the secure message encrypted with the private security key in the operation 204.

After the hint is received, a private security key having a timestamp is generated for the secure message in an operation 206. In an embodiment, the private security key is generated using the hint and the answer associated with the hint. Examples of the private security key include an AES symmetrical security key, or any other type of private encryption. When the secure message is stored, the secure message is encrypted. The private security keys allow for decryption of the secure message. In some embodiments, a client device, such as the client device 104, generates the private security key. In alternative embodiments, a webserver, such as the webserver 110, generates the private security key. Furthermore, the timestamp associated with the private security key is used to time out the secure message. In certain embodiments, after the expiration of a given amount of time calculated using the timestamp, the secure message is timed out and will be deleted. After generation of the private security key, contents for the secure message are received from the sender in an operation 208. The contents include the content that is intended for the intended recipient. Examples of content may include an alphanumeric message, an audio message, a video message, or any combination thereof that is intended for the intended recipient. In one embodiment, the client device associated with the user, such as the client device 104, receives the contents of the secure message. In an alternative embodiment, the webserver, such as the webserver 110, receives the contents for the secure message.

After the contents for the secure message are received in the operation 208, the secure message, which includes the contents received from the sender, is generated in an operation 210. Moreover, the secure message is encrypted where the secure message may be decrypted using the private security key. In one embodiment, the client device associated with the user, such as the client device 104, creates the secure message. In an alternative embodiment, a webserver, such as the webserver 110, creates the secure message.

After creation of the secure message, the secure message, the private security key, the hint, and the answer/passcode associated with the hint are stored at the entity that created the private security key in an operation 212. For ease of discussion, the location at which the secure message, the private security key, the hint, and the answer/passcode associated with the hint are stored will be referred to as the storage location. It should be noted that the secure message is stored in an encrypted format. As noted above, in some embodiments, a timestamp is associated with the private security key where the private security key may expire after the passage of a given amount of time. In certain embodiments, after the expiration of a given amount of time calculated using the timestamp, the secure message is deleted from storage. In one embodiment, the secure message, the private security key, the hint, and the answer/passcode associated with the hint are stored at a client device associated with the sender, such as the client device 104. In an alternative embodiment, a webserver, such as the webserver 110, stores the secure message, the private security key, the hint, and the answer/passcode associated with the hint. The secure message, the private security key, the hint, and the answer/passcode associated with the hint are stored at the client device until the secure message is sent to the intended recipient. Alternatively, the secure message is deleted from the client device when the private security key times out. Specifically, after a duration of time elapses from the timestamp indicating when the private security key was created, such as one week or one month after the creation of the timestamp, the secure message is deleted from the storage location. In an alternative embodiment, the secure message, the private security key, the hint, and the answer/passcode associated with the hint are stored at the webserver 110. It should be noted that storing the private security key at a client device minimizes the possibility of an unauthorized third party gaining access to the private security key.

Once operation 212 is complete, a URL message that includes a URL and a message is created and sent to the intended recipient in an operation 214. In one embodiment, a template for URL messages is stored at the storage location. Names for the sender and the intended recipient along with a custom message from the sender and the hint are inserted into the URL message. The URL message is stored at the storage location in an encrypted format and has a unique file identifier that is then used with an algorithm to create a unique string of numbers and letters that are decoded by the storage location when the URL message is sent to the intended recipient.

It should be noted that the URL message is separate and distinct from the secure message. In particular, the URL message is not the secure message. Instead, the URL message serves, in an embodiment, as notification to the intended recipient that the secure message is available. Moreover, in some embodiments, the URL message may be clickable and includes information sufficient to locate the secure message at the storage location. Moreover, the URL message may be created by a webserver or client software. In some embodiments, the secure message may be intended for multiple recipients. In these embodiments, the URL message may be multicasted to the multiple recipients. In some embodiments, a client device, such as the client device 104, sends the URL message. In alternative embodiments, a webserver, such as the webserver 110, sends the URL message.

The URL message may be sent using any type of communication medium. For example, the URL message may be sent via email, Twitter®, Facebook®, SMS, text messaging, or the like. In essence, anything that conveys a URL, or the like, may be used. It should be noted that the transmission of the URL message is not restricted to these communication or social mediums and embodiments of the present invention contemplate the usage of any type of communication or social mediums. For example, the URL in the URL message may be verbally communicated to the intended recipient or via written communications.

The URL directs the intended recipient back to the storage location. For example, the URL is an address for either the client device associated with the sender, such as the client device 104, or a webserver, such as the webserver 110. The URL message indicates to the intended recipient that a message from the sender that is remotely stored from the intended recipient is available.

Figure 3:
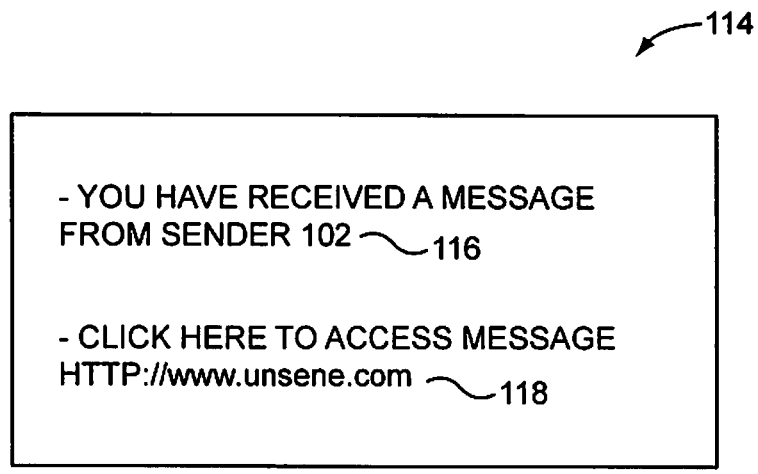
FIG. 3 illustrates a URL message in accordance with an embodiment of the present invention.

An example of a URL message that is sent to the intended recipient is shown with reference to FIG. 3. This Figure illustrates a URL message 114 in accordance with an embodiment of the present invention. In some embodiments, the URL message 114 may be any type of message that has a URL therein, such as an email, a text message, a Twitter® feed, a Facebook® posting, or the like. In FIG. 3, the URL message 114 includes a notification 116 that indicates to the intended recipient that a notification has been sent to the intended recipient from the sender. The URL message also includes a URL 118, which may be engaged by the intended recipient. As those skilled in the art will appreciate, the URL may be engaged in a number of ways, including double clicking the URL 118 and control clicking the URL 118, or the like.

Returning to the method 200, as shown with reference to FIG. 2B, after the URL message is sent to the intended recipient, a determination is made if the intended recipient has engaged the URL and has been redirected to the storage location. More specifically, a determination is made as to whether or not a URL response has been received from the intended recipient indicating that the intended recipient has engaged the URL in the URL message in an operation 216. In particular, when the intended recipient engages the URL, a URL message response is sent to the storage location. For example, when the intended recipient double-clicks the URL, the intended recipient is redirected to the storage location. By way of the redirection, the storage location determines that the intended recipient has engaged the URL. In some embodiments, a client device, such as the client device 104, determines if the intended recipient has engaged the URL by receiving a URL message response. In alternative embodiments, a webserver, such as the webserver 110, determines if the intended recipient has engaged the URL by receiving a URL message response. If the storage location has not received a response before the private security key times out, then the secure message is deleted and the method 200 is complete.

Otherwise, in response to determining that the intended recipient has engaged the URL in the URL message, the storage location sends a landing message to the intended recipient. The landing message is created by generating a web browser readable HTML page having the message in the URL message, the hint, and sender information that helps the intended recipient authenticate the sender and message.

Examples of sender information include the sender's name, an official title of the sender, or any other information that allows the intended recipient to recognize that the landing message is not spam or any other type of unauthorized message. The landing message also includes the hint. The hint may include images, videos, audio and text data, an emblem, or the like. Thus, the intended recipient sees the contents of the URL message and the hint, as well as any other identifying information to help authenticate the sender to the intended recipient.

Figure 4:
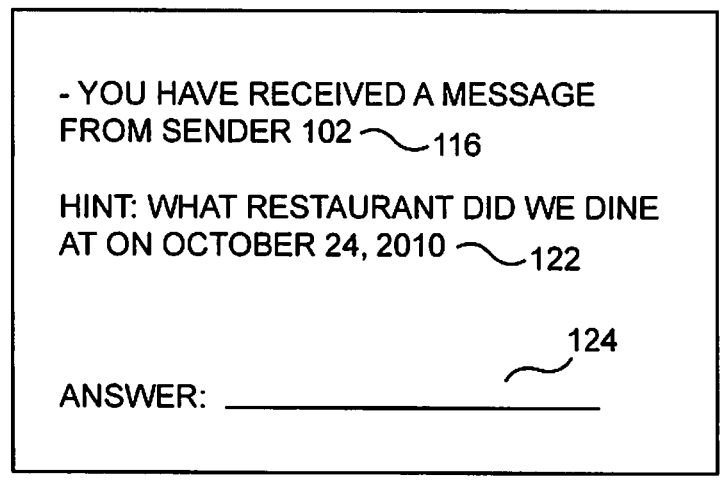
FIG. 4 illustrates a landing message that is sent to an intended recipient when the intended recipient engages a URL in a URL message in accordance with an embodiment of the present invention.

An example of a landing message is shown with reference to FIG. 4. FIG. 4 illustrates a landing message 120 that is sent to the intended recipient when the intended recipient engages the URL in the URL message 114. The landing message 120 includes the hint, such as a hint 122, and an area 124 for providing the answer to the hint. The hint 122 is the hint that was provided by the sender in the operation 210, as described above. The answer is the passcode that will be used to access the private security key, also as described above. The storage location generates the landing message 120 and sends the landing message 120 to the intended recipient. For example, the hint 122 is "What restaurant did we dine at on Oct. 24, 2010?" As noted above, the answer to this hint, and the passcode that allows access to the private security key, is "Sullivan's Steakhouse." In this embodiment, the intended recipient inserts "Sullivan's Steakhouse" in the area 124 and sends the landing message back to the storage location, as noted in an operation 220.

Turning attention back to FIG. 2B and the method 200, when the storage location receives a response to the hint, the storage location determines if the answer is correct in an operation 222. As noted above, the hint related to a previous dinner between the sender and the intended recipient and the answer was "Sullivan's Steakhouse." In this example, the storage location determines that "Sullivan's Steakhouse" is the correct answer. As noted above, the correct answer to the hint corresponds to the passcode that is used to access the private security key and decrypt the secure message. In response to determining that the answer is correct, the storage location accesses the private security key and decrypts the secure message in an operation 224 and then re-encrypts the secure message in a format that is recognizable to a device associated with the intended recipient in an operation 226. For example, if the storage location uses a security protocol of a first type, such as the AES standard, and a device associated with the intended recipient uses a security protocol of a second type different from the first type, such as 256 SSL, the storage location decrypts the secure message from the AES and then re-encrypts the secure message using 256 SSL. After the secure message is decrypted from the first security protocol type and then re-encrypted using the second security protocol type, the storage location sends the secure message to the intended recipient in an operation 228. In some embodiments, a client device, such as the client device 104, performs the operations 222-228. In alternative embodiments, a webserver, such as the webserver 110, performs the operations 222-228.

Returning to the operation 222, if the storage location determines that the answer to the hint is incorrect, the storage location denies delivery of the secure message in an operation 230. In alternative embodiments, the storage location may continue to resend the landing message 120 a predetermined number of times until the correct answer is received. Moreover, in alternative embodiments, if a predetermined number of wrong answers are received, the intended recipient is locked out from providing further answers.

Figure 5:
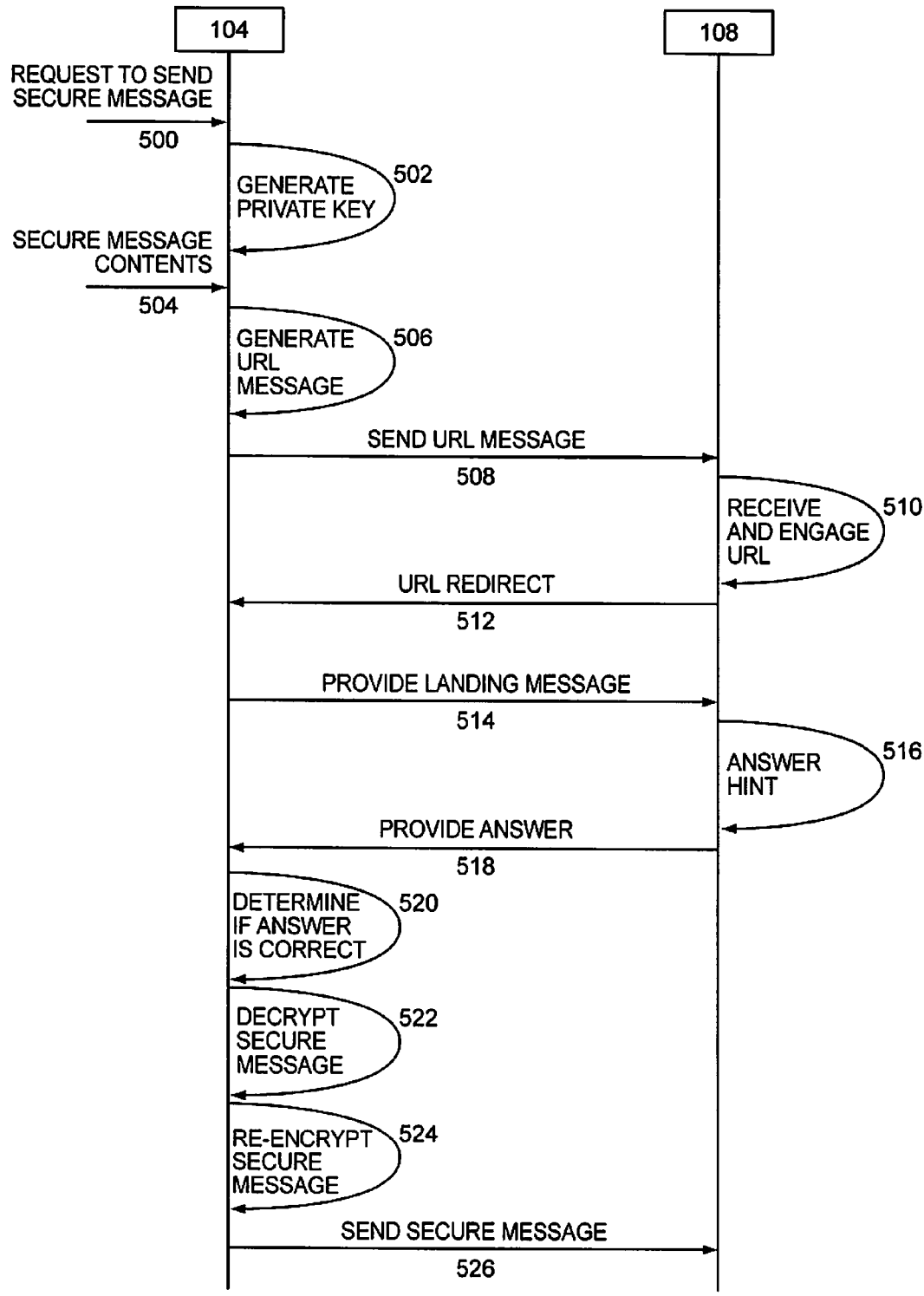
FIG. 5 illustrates a method for generating and delivering a secure message via a web service where an encrypted message for an intended recipient is converted to a URL and sent to the intended recipient in accordance with an embodiment of the present invention.

FIG. 5 illustrates a method for generating and delivering a secure message via a web service where a secure message for an intended recipient is converted to a URL and sent to the intended recipient in accordance with an embodiment of the present invention. In the example shown with reference to FIG. 5, the client device 104 is a device that employs the JavaScript® scripting language and uses a symmetric security protocol, such as a security protocol in accordance with the AES specification. It should be noted while embodiments of the present invention describe devices that use JavaScript®, any type of high level programming language or web application may be used in accordance with embodiments of the present invention. In addition, in the example shown with reference to FIG. 5, the client device 108 uses a scripting language different from the JavaScript® scripting protocol and uses a security protocol that is different from the AES standard, such as the SSL protocol. It should be noted that while two specific types of security protocols have been described, embodiments of the present invention are not limited to these specified protocols. In particular, embodiments of the present invention may be practiced with any security protocol, where the client devices 104 and 108 each have different security protocols. Furthermore, while the JavaScript® scripting language has been described, embodiments of the present invention should not be limited to this type of scripting language. More specifically, embodiments of the present invention may be used with any scripting language.

Turning back to FIG. 5, initially, the client device 104 receives a request to send a secure message from the sender 102 at an operation 500. In particular, the sender 102 may access the client device 104 and submit a request to send a secure message. In an embodiment, the sender 102 accesses a window in any standard operating environment on the client device 104. In response to receiving the request to create the secure message, the client device 104 generates a private security key having a timestamp for the secure message in an operation 502. As detailed above, examples of the private security key include an AES symmetrical security key, or any other type of private security key. The private security key is used to decrypt the encrypted secure message. As detailed above, when a secure message is stored at the client device 104, the secure message is encrypted in order to minimize the possibility that an unauthorized third party gains access to the secure message. After generating the private security key, the sender 102 provides the contents of the secure message to the client device 104 in an operation 504. As noted above, the contents may include alphanumeric characters, audio content, video content, or a combination thereof. The client device 104 then generates the secure message that includes the contents, encrypts the secure message, and stores the secure message.

The client device 104 then generates a URL message in an operation 506 and sends the URL message to the client device 108 associated with the intended recipient 106 in an operation 508, as described above with reference to FIG. 2A and the operation 214. Moreover, the client device 104 may send the URL message 114 using any type of communication medium or any type of social media, also as described with reference to FIG. 2A. For example, the client device 104 generates the URL message 114 in the operation 506 and sends the URL message 114 to the client device 108 in the operation 508 via a Facebook® posting.

The intended recipient 106 receives the URL message at the client device 108 and engages the URL in the URL message in an operation 510. For example, the intended recipient 106 receives the URL message 114 at the client device 108 via the Facebook® posting where the URL message 114 indicates to the intended recipient 106 that the sender 102 has sent a message to the intended recipient 106. In this example, the Facebook® posting also includes the URL that redirects the intended recipient to the client device 104. The intended recipient 106 then engages the URL 118 by clicking the URL 118. It should be noted that the URL message 114 may not be immediately received by the intended recipient 106 when the client device 104 sends the URL message 114. More specifically, the intended recipient may not be capable of receiving communications at their client device 108, such as when the intended recipient 106 is traveling. In this embodiment, when the client device 108 is able to receive communications, such as an email, a Twitter® feed, a Facebook® posting, or the like, the client device 108 and the intended recipient 106 receive the URL message 114. Furthermore, in some embodiments, the intended recipient may receive the URL message at a device other than the client device 108.

In response to clicking the URL 118, the intended recipient 106 is redirected to the client device 104 in an operation 512. In this embodiment, when the intended recipient 106 is redirected to the client device 104, the client device 104 provides a landing message to the client device 108 and the intended recipient 106 in an operation 514. As noted above, the landing message includes a hint and a space to provide an answer to the hint where the answer is a passcode for accessing the private security key. Returning to the example, when the intended recipient clicks on the URL 118, the client device 104 sends the landing message 120 to the client device 108 and the intended recipient 106.

In an operation 516, the intended recipient 106 answers the hint and provides the answer to the client device 104 in an operation 518. Turning attention back to the example, as detailed above, the landing message 120 includes the hint 122 and the area 124 for providing an answer to the hint 122. As detailed above, the answer is the passcode that is ultimately used to decrypt the secure message. In the embodiment shown with respect to FIG. 4, the hint 122 is "What restaurant did we dine at on Oct. 24, 2010?" As noted above, the answer to this hint, and the passcode that will provide access to the private security key, is "Sullivan's Steakhouse." In the example, in the operation 516, the intended recipient 106 places the answer "Sullivan's Steakhouse" in the area 124 and the answer is provided to the client device 104 in the operation 518.

When the client device 104 receives the answer, the client device 104 determines if the answer to the hint is correct in an operation 520. In the example, the hint related to a previous dining experience between the sender 102 and the intended recipient 106. In addition, the answer was "Sullivan's Steakhouse." As noted above, "Sullivan's Steakhouse" was the correct answer and therefore the passcode.

If the client device 104 determines that the intended recipient has provided the correct answer, the client device 104 accesses the private security key associated with the secure message and then decrypts the secure message in an operation 522. Afterwards, the client device 104 re-encrypts the secure message in an operation 524 and sends the re-encrypted secure message to the client device 108. Returning to the example, as noted above, the client device 104 has a security protocol, i.e., AES, which is different from the security protocol of the client device 108, i.e., SSL. In this example, when the intended recipient provides the proper passcode, the private security key is accessed to decrypt the secure message. However, since the client device 108 uses a security protocol that is different from the security protocol used at the client device 104, the client device 104 re-encrypts the secure message with a security protocol used by the client device 108 such that the intended recipient may access the secure message at the client device 108. Specifically, the client device 104 de-crypts the secure message from the AES standard in the operation 522 and then re-encrypts the secure message in accordance with the SSL protocol in the operation 524. After re-encryption, the client device 104 sends the secure message to the client device during an operation 526. It should be noted that while the discussion focuses on the client device 108 that is associated with the intended recipient 106, the embodiment shown with reference to FIG. 5 may be performed when the intended recipient 106 is at a device other than the client device 108. Specifically, the intended recipient 106 may be at a device other than their own device, i.e., a borrowed device and the operations noted above may be coded in whatever native language is used at the borrowed device.

It should be noted that the secure message is stored at the client device according to the security protocol of the client device 104, i.e., AES. In accordance with an embodiment of the present invention, while the secure message is stored at the client device 104, the secure message remains encrypted during storage, thereby limiting the ability of third party users to make unauthorized access to the secure message. Moreover, the private security key remains with the secure message.

Figure 6:
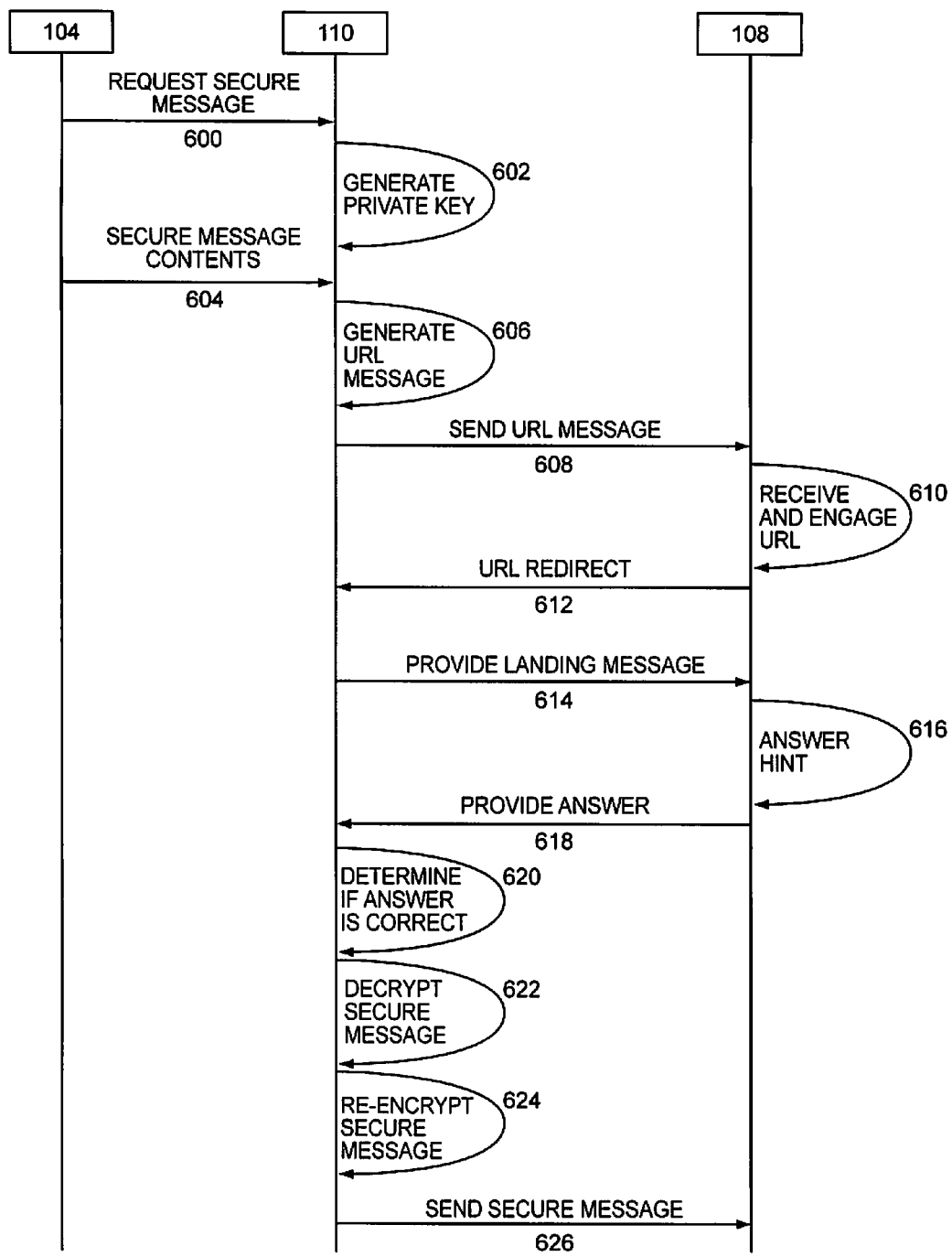
FIG. 6 illustrates a method for generating and delivering a secure message via a web service where an encrypted message for an intended recipient is converted to a URL and sent to the intended recipient in accordance with an embodiment of the present invention.

FIG. 6 illustrates a method for generating and delivering a secure message via a web service where an encrypted message for an intended recipient is converted to a URL and sent to the intended recipient in accordance with an embodiment of the present invention. In the example shown with reference to FIG. 6, the webserver 110 is a device that employs the JavaScript® scripting language and uses a symmetric security protocol, such as a security protocol in accordance with the AES specification. In addition, in the example shown with reference to FIG. 6, the client device 108 uses a scripting language different from the JavaScript® scripting protocol and uses a security protocol that is different from the AES standard, such as the SSL protocol. It should be noted that while two specific types of security protocols have been described, embodiments of the present invention are not limited to these specified protocols. In particular, embodiments of the present invention may be practiced with any security protocol, where the webserver 110 and the client device 108 each have different security protocols. Furthermore, while the JavaScript® scripting language has been described, embodiments of the present invention should not be limited to this type of scripting language. More specifically, embodiments of the present invention may be used with any scripting language.

Initially, the sender 102 sends a request to send a secure message to the webserver 110 from the client device 104 during an operation 600. When the sender 102 sends the request, the sender 102 accesses a web page provided by the webserver 110 and submits a request to send a secure message at the web page. In response to receiving the request to send the secure message, the webserver 110 generates a private security key having a timestamp for the secure message in an operation 602. In this embodiment, the private security key may include the characteristics described above. The private security key is used to decrypt the encrypted secure message. When a secure message is stored at the webserver 110, the secure message is encrypted in order to minimize the possibility that an unauthorized third party gains access to the secure message. After generating the private security key, the sender 102 provides the contents of the secure message from the client device 104 to the webserver 110 in an operation 604. As noted above, the contents may include alphanumeric characters, audio content, video content, or a combination thereof. The webserver 110 then generates the secure message that includes the contents, encrypts the secure message, and stores the secure message.

The webserver 110 then generates a URL message in an operation 606 and sends the URL message to the client device 108 associated with the intended recipient 106 in an operation 608. Moreover, the webserver 110 may send the URL message 114 using any type of communication medium or any type of social media, also as described above with reference to the method 200. For example, the webserver 110 generates the URL message 114 in the operation 606 and sends the URL message 114 to the client device 108 in the operation 608 via an email.

The intended recipient 106 receives the URL message at the client device 108 and engages the URL in the URL message during an operation 610. For example, the intended recipient 106 receives the URL message 114 at the client device 108 via the email where the URL message 114 indicates to the intended recipient 106 that the sender 102 has sent a message to the intended recipient 106. The intended recipient 106 then engages the URL 118 by clicking the URL 118. It should be noted that the URL message 114 may not be immediately received by the intended recipient 106 when the webserver 110 sends the URL message 114. More specifically, the intended recipient may not be capable of receiving communications at their client device 108, such as when the intended recipient 106 is traveling. In this embodiment, when the client device 108 is able to receive communications, such as an email, a Twitter® feed, a Facebook® posting, or the like, the client device 108 and the intended recipient 106 receive the URL message 114.

In response to clicking the URL 118, the intended recipient 106 is redirected to the webserver 110 in an operation 612. In this embodiment, when the intended recipient 106 is redirected to the webserver 110, the webserver 110 provides a landing message to the client device 108 and the intended recipient 106 in an operation 614. As noted above, the landing message includes a hint and a space to provide an answer to the hint where the answer is a passcode for accessing the private security key. Returning to the example, when the intended recipient clicks on the URL 118, the webserver 110 sends the landing message 120 to the client device 108 and the intended recipient 106.

During an operation 616, the intended recipient 106 answers the hint and provides the answer to the webserver 110 in an operation 618. Turning attention back to the example, as detailed above, the landing message 120 includes the hint 122 and the area 124 for providing an answer to the hint 122. As detailed above, the answer is the passcode that is ultimately used to decrypt the secure message. In the embodiment shown with respect to FIG. 4, the hint 122 is "What restaurant did we dine at on Oct. 24, 2010?" As noted above, the answer to this hint, and the passcode that provides access to the private security key, is "Sullivan's Steakhouse." In the example, in the operation 616, the intended recipient 106 places the answer "Sullivan's Steakhouse" in the area 124 and the answer is provided to the webserver 110 in the operation 618.

When the webserver 110 receives the answer, the webserver 110 determines if the answer to the hint is correct in an operation 620. In the example, the hint related to a previous dining experience between the sender 102 and the intended recipient 106. In addition, the answer was "Sullivan's Steakhouse." As noted above, "Sullivan's Steakhouse" was the correct answer and therefore the passcode.

If the webserver 110 determines that the intended recipient has provided the correct answer, the webserver 110 accesses the private security key associated with the secure message and then decrypts the secure message in an operation 622. Afterwards, the webserver 110 re-encrypts the secure message in an operation 624 and sends the re-encrypted secure message to the client device 108. Returning to the example, as noted above, the webserver 110 has a security protocol, i.e., AES, which is different from the security protocol of the client device 108, i.e., SSL. In this example, when the intended recipient provides the proper passcode, the private security key is accessed to decrypt the secure message. However, since the client device 108 uses a security protocol that is different from the security protocol used at the webserver 110, the webserver 110 re-encrypts the secure message with the security protocol used by the client device 108 such that the intended recipient may access the secure message at the client device 108. Specifically, the webserver 110 de-crypts the secure message from the AES standard in the operation 622 and then re-encrypts the secure message in accordance with the SSL protocol in the operation 624. After re-encryption, the webserver 110 sends the secure message to the client device during an operation 626.

While FIGS. 2-6 disclose embodiments where the client device 104 has a first type of security and the client device 108 has a second type of security different from the first type of security, in further embodiments of the present invention, each of the client devices 104 and 108 have both the first type of security and the second type of security where both the first type of security and the second type of security are used during transmission of the secure message. Likewise, while FIGS. 2-6 disclose embodiments where the webserver 110 has a first type of security and the client device 108 has a second type of security different from the first type of security, in further embodiments of the present invention, each of the webserver 110 and the client device 108 have both the first type of security and the second type of security where both the first type of security and the second type of security are used during transmission of the secure message.

Figure 7:
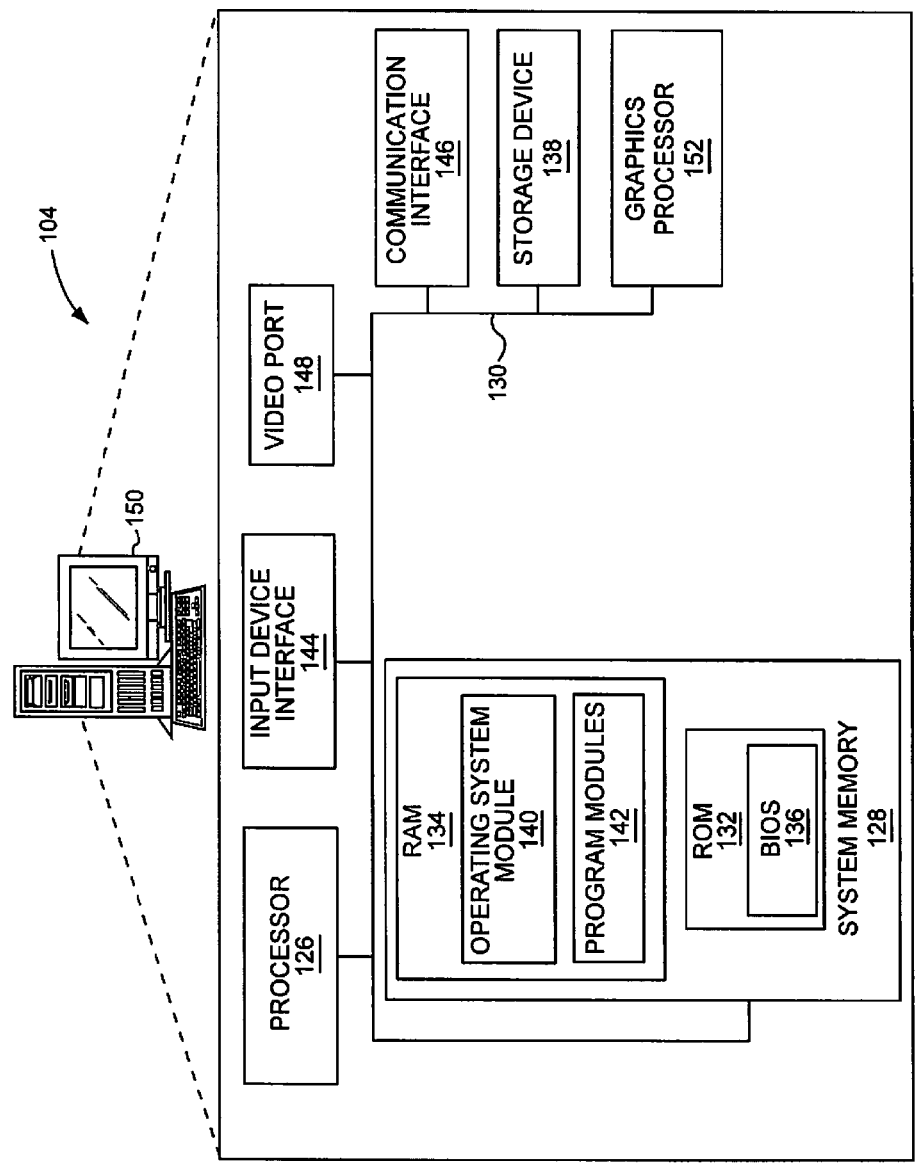
FIG. 7 is a block diagram of a client device according to one embodiment of the present invention.

FIG. 7 is a block diagram of the client device 104 according to one embodiment of the present invention. It should be noted that while this discussion focuses on the client device 104, this description is equally applicable to the client device 108, where the client device 108 includes identical components having identical functionality. Moreover the description in FIG. 7 is also applicable to the webserver 110, where the webserver 110 includes the necessary components to operate as a hardware server and may or may not include all the components discussed with reference to FIG. 7, such as a display device and various input devices, or the like. The client device 104 may comprise any computing or processing device capable of executing software instructions to implement the functionality described herein, such as, by way of non-limiting example, a work station, a desktop or laptop computer, a tablet computer, or the like. The client device 104 includes a processor 126, a system memory 128, and a system bus 130. The system bus 130 provides an interface for system components including, but not limited to, the system memory 128 and the processor 126. The processor 126 may be any commercially available or proprietary processor. Dual microprocessors and other multi-processor architectures may also be employed as the processor 126.

The system bus 130 may be any of several types of bus structures that may further interconnect to a memory bus (with or without a memory controller), a peripheral bus, and/or a local bus using any of a variety of commercially available bus architectures. The system memory 128 may include non-volatile memory 132 (e.g., read only memory (ROM), erasable programmable read only memory (EPROM), electrically erasable programmable read only memory (EEPROM), etc.) and/or volatile memory 134 (e.g., random access memory (RAM)). A basic input/output system (BIOS) 136 may be stored in the non-volatile memory 132, and can include the basic routines that help to transfer information between elements within the client device 104. The volatile memory 134 may also include a high-speed RAM, such as static RAM, for caching data.

The client device 104 may further include the computer-readable storage device 138, which may comprise, by way of non-limiting example, an internal hard disk drive (HDD) (for example, an enhanced integrated drive electronics (EIDE) HDD or serial advanced technology attachment (SATA) HDD), a flash memory, or the like. The computer-readable storage device 138 and other drives, sometimes referred to as computer-readable or computer-usable media, provide non-volatile storage of data, data structures, computer-executable instructions, and the like. Although for purposes of illustration the description of the computer-readable storage device 138 above refers to a HDD, it should be appreciated by those skilled in the art that other types of media which are readable by a computer, such as zip disks, magnetic cassettes, flash memory cards, cartridges, a Universal Serial Bus memory stick, and the like, may also be used in the operating environment, and further, that any such media may contain computer-executable instructions for performing novel functionality as disclosed herein.

A number of modules can be stored in the computer-readable storage device 138 and in the volatile memory 134, including an operating system module 140 and one or more program modules 142, which may implement the functionality described herein in whole or in part. It is to be appreciated that the embodiments can be implemented with various commercially available operating system modules 140 or combinations of operating system modules 140.

All or a portion of the embodiments may be implemented as a computer program product stored on a non-transitory computer-usable or computer-readable storage medium, such as the computer-readable storage device 138, which may include complex programming instructions, such as complex computer-readable program code, configured to cause the processor 126 to carry out the functionality described herein. Thus, the computer-readable program code can comprise software instructions for implementing the functionality of the embodiments described herein when executed on the processor 126. The processor 126, in conjunction with the program modules 142 in the volatile memory 134, may serve as a control system for the client device 104 that is configured to, or adapted to, implement the functionality described herein.

A user may be able to enter commands and information into the client device 104 through one or more input devices, such as, for example, a keyboard (not illustrated), a pointing device such as a mouse (not illustrated), a touch-sensitive surface (not illustrated), or the like. Other input devices may include a microphone, an infrared (IR) remote control, a joystick, a game pad, a stylus pen, or the like. These and other input devices may be connected to the processor 126 through an input device interface 144 that is coupled to the system bus 130, but can be connected by other interfaces such as a parallel port, an Institute of Electrical and Electronic Engineers (IEEE) 1394 serial port, a Universal Serial Bus (USB) port, an IR interface, and the like.

The client device 104 may also include a communication interface 146 suitable for communicating with the network 112. The client device 104 may also include a video port 148 that drives the display device 150. The video port 148 may receive imagery, such as water surface imagery, from a graphics processor 152.

The display device 150 may be separate from the client device 104, or may be integrated with the device. Non-limiting examples of the display device 150 include an LCD or plasma monitor, a projector, or a head-mounted display.

Figure 8A:
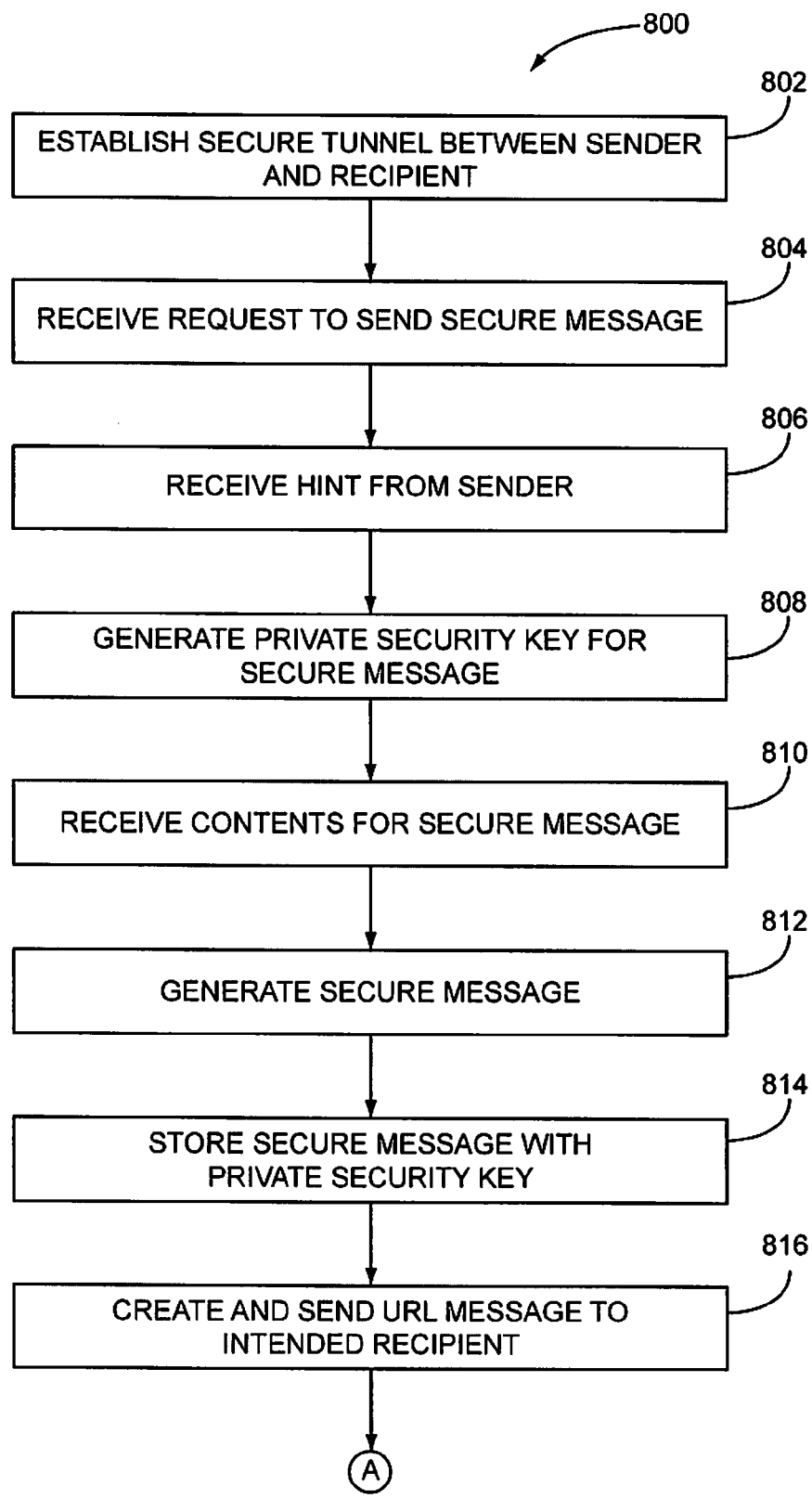
FIGS. 8A and 8B are flowcharts that illustrate a method for providing a secure message to an intended recipient as a URL message.
Figure 8B:
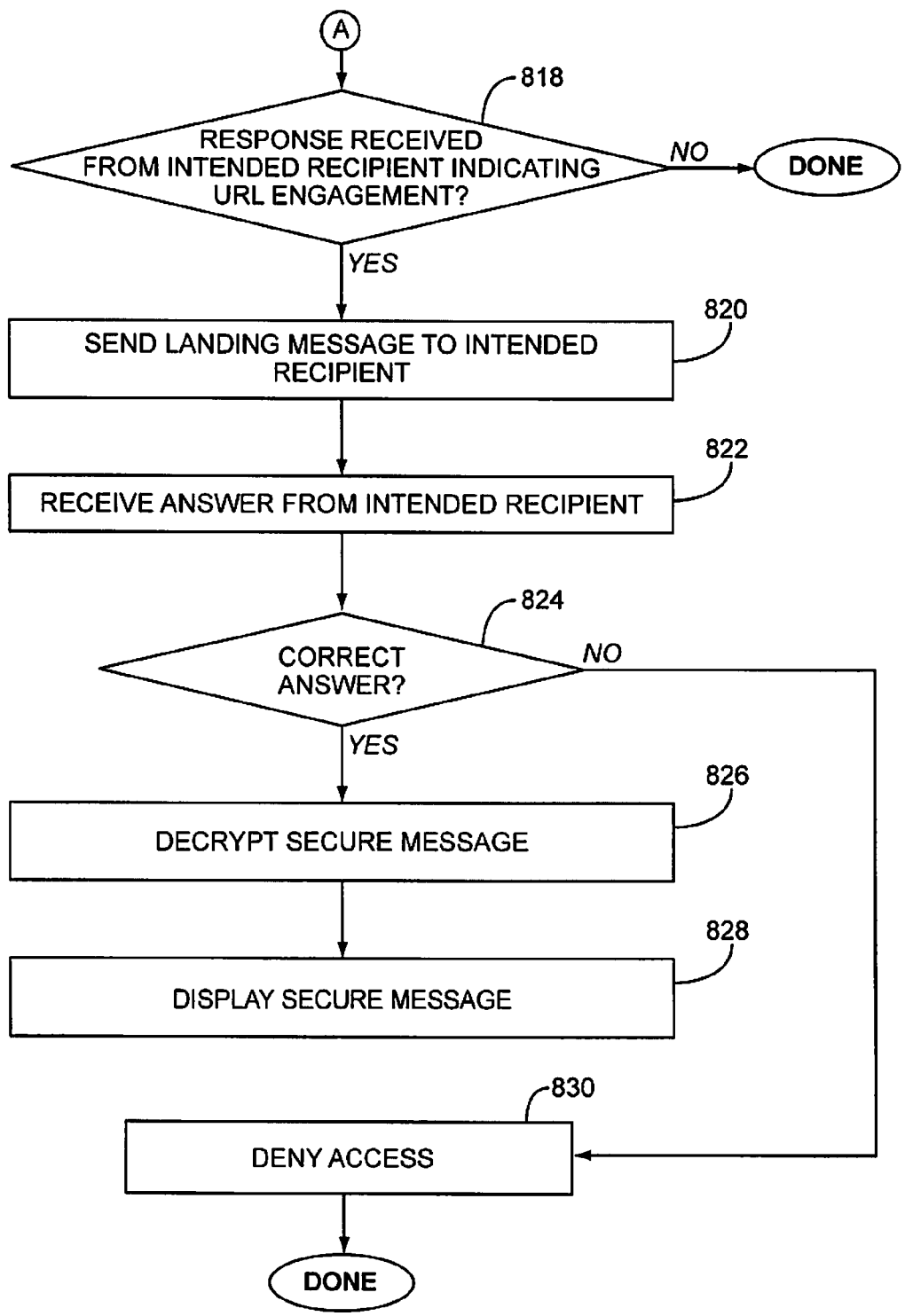

As noted above, in some embodiments, the intended recipient 106 receives the secure message at the client device 108, such that the intended recipient 106 may read the secure message at the client device 108. In further embodiments, the intended recipient 106 may view the secure message at either the client device 104 or the webserver 110, as illustrated with respect to FIGS. 8A and 8B and a method 800. Initially, a secure tunnel is established between a storage device and a device that is associated with an intended recipient in an operation 802. In one embodiment, any type of tunneling scheme may be used to establish the secure tunnel between a storage location and a device that is associated with the intended recipient. For example, a tunneling scheme in accordance with either the SSL or the TLS protocols may be used. However, the present invention is not limited to either of these security protocols, nor should embodiments of the present invention be considered as being limited to these security protocols.

For example, in an embodiment where the client device 104 is the storage location, a tunnel is established between the client device 104 and the client device 108 that is associated with the intended recipient 106 in accordance with the SSL protocol. In an embodiment where a webserver, such as the webserver 110, is the storage location, a tunnel is established between the webserver 110 and the client device 108 in accordance with the SSL protocol. After establishment of the secure tunnel, operations 804-822 are performed. These operations are substantially similar to operations 202-220 discussed with reference FIGS. 2A and 2B. Therefore, for ease of discussion, operations 802-822 will not be discussed.

As mentioned above, in the operation 220, which is similar to the operation 822, an answer to a hint is received at a storage location from an intended recipient. After the storage location receives the answer, the storage location determines if the answer is correct in an operation 824. For example, the hint related to a previous dining experience between the sender and the intended recipient and the answer was "Sullivan's Steakhouse." In this example, the storage location receives the answer "Sullivan's Steakhouse" and determines that "Sullivan's Steakhouse" is the correct answer. As noted above, in an embodiment, the correct answer to the hint corresponds to the passcode that is used to access the private security key. In response to determining that the answer is correct, the storage location accesses the private key along with the secure message and decrypts the secure message using the private security key in an operation 826. After decryption, the secure message is displayed to the intended recipient in an operation 828.

For example, in an embodiment where a webserver, such as the webserver 110, performs the method 800, the webserver 110 decrypts the secure message during the operation 826 and then displays the secure message, at the webserver 110, to the intended recipient 106. Here, the intended recipient 106 physically views the secure message at the client device 108. As noted above, a secure tunnel is established with the intended device, i.e., between the webserver 110 and the client device 108, such that unauthorized third parties may not view the contents of the secure message during display of the secure message. It should be noted that in further embodiments, the client device 104 may perform all the operations of the method 800.

Turning back to the operation 824, if a determination is made that the intended recipient provided the incorrect answer, the storage location denies delivery of the secure message. In alternative embodiments, the storage location may continue to resend a landing message as noted in the operation 820 a predetermined number of times until the correct answer is received. Moreover, in alternative embodiments, if a predetermined number of wrong answers are received, the intended recipient is locked out from providing further answers.

Figure 9:
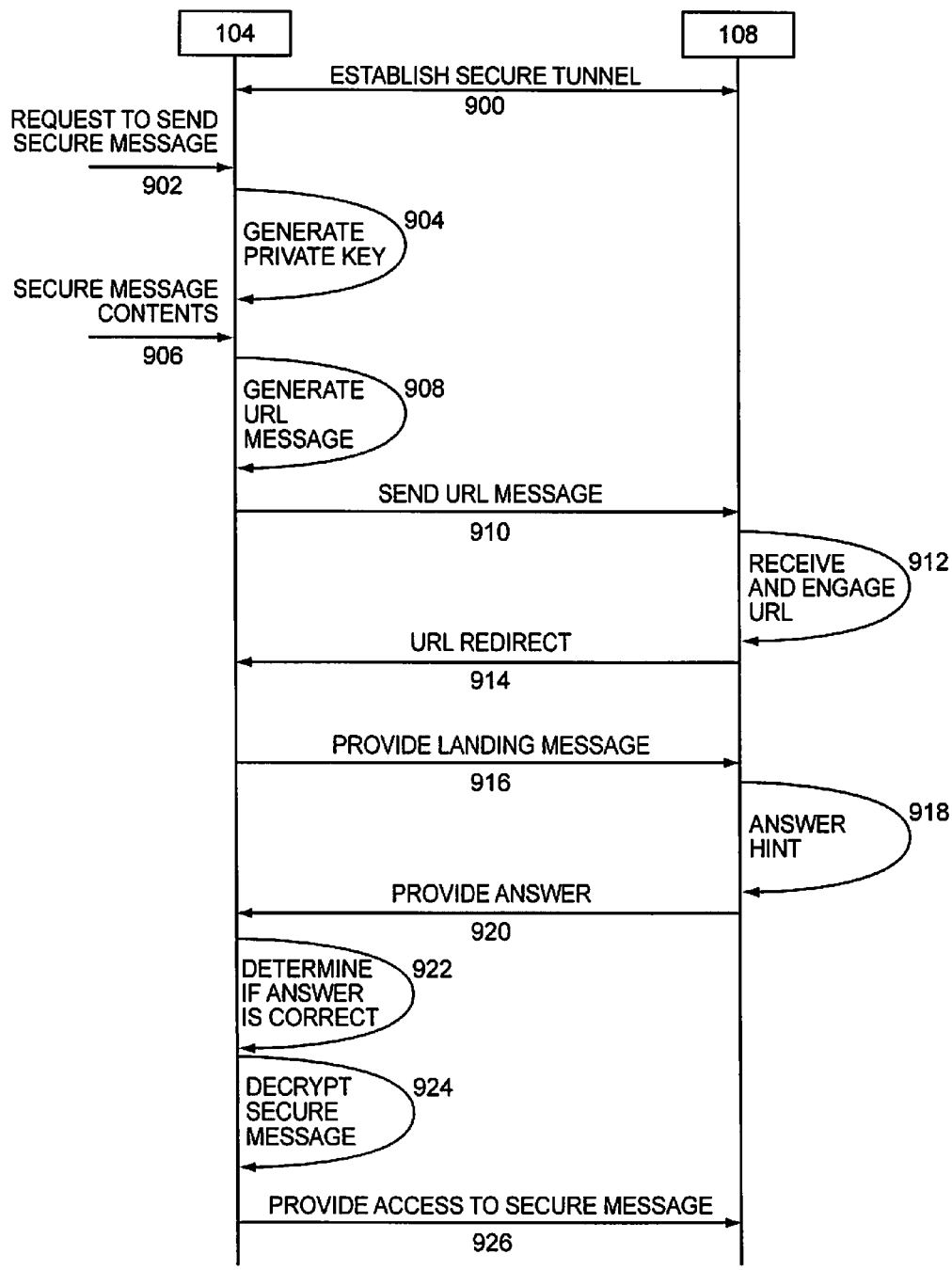
FIG. 9 illustrates a method for generating and delivering a secure message via a web service where an encrypted message for an intended recipient is converted to a URL and sent to the intended recipient in accordance with an embodiment of the present invention.

FIG. 9 illustrates a method for generating and delivering a secure message via a web service where an encrypted message for an intended recipient is converted to a URL and sent to the intended recipient in accordance with an embodiment of the present invention. Initially, a secure tunnel is established between the client device 104 and the client device 108 in an operation 900 as described with reference to FIG. 8A and the operation 802. The secure tunnel may be established using any well-known method, such as the SSL or TLS security protocols. In an embodiment, the secure tunnel allows for secure communications between the client device 104 and the client device 108. After the secure tunnel is established in the operation 900, operations 902-920 are performed. These operations are substantially similar to the operations 500-518 discussed with reference FIG. 5. Therefore, for ease of discussion, operations 902-920 will not be discussed in great detail and reference should be made to FIG. 5 and the operations 500-518.

In the operation 920, the client device 108 provides an answer input from the intended recipient 106, similar to the operation 518. In response to receiving the answer in the operation 920, the client device 104 determines if the answer is correct in an operation 922. For example, in an embodiment the hint relates to a previous dining experience between the sender and the intended recipient. As noted above, "Sullivan's Steakhouse" is the correct answer and is the passcode.

In response to determining that the answer is correct, the client device 104 accesses the private key along with the secure message and decrypts the secure message using the private key in an operation 924. Once the secure message is decrypted, the client device 104 displays the secure message, where the intended recipient 106 views the secure message at the client device 108. As noted above, a secure tunnel is established with the intended recipient's device, i.e., between the client device 104 and the client device 108, such that unauthorized third parties may not view the contents of the secure message during display of the secure message. It should be noted that while the discussion focuses on the client device 108 that is associated with the intended recipient 106, the embodiment shown with reference to FIG. 9 may be performed when the intended recipient 106 is at a device other than the client device 108. Specifically, the intended recipient 106 may be at a device other than their own device, i.e., a borrowed device.

Figure 10:
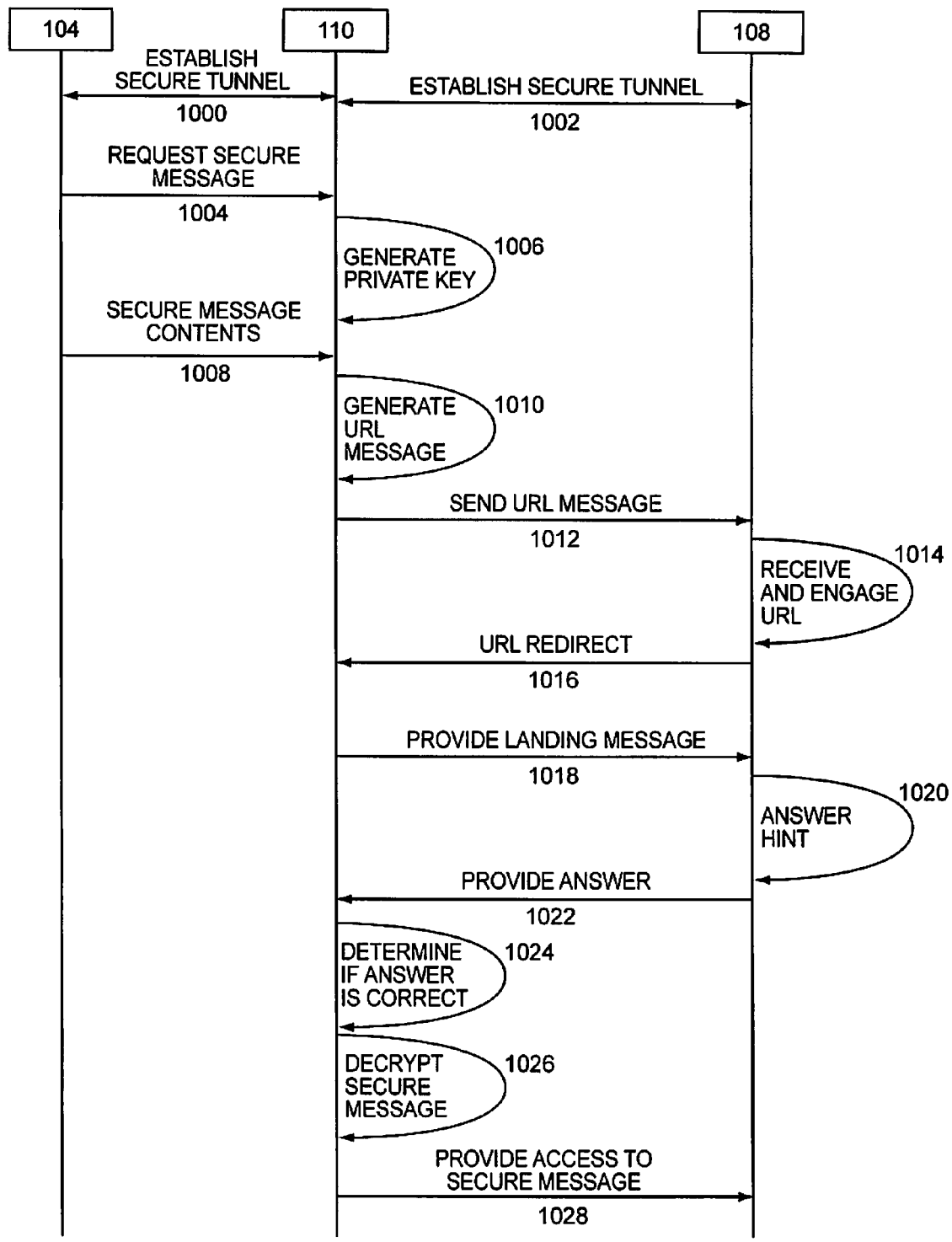
FIG. 10 illustrates a method for generating and delivering a secure message via a web service where an encrypted message for an intended recipient is converted to a URL and sent to the intended recipient in accordance with an embodiment of the present invention.

FIG. 10 illustrates a method for generating and delivering a secure message via a web service where an encrypted message for an intended recipient is converted to a URL and sent to the intended recipient in accordance with a further embodiment of the present invention. Initially, secure tunnels are established between the client device 104 and the webserver 110 and the webserver 110 and the client device 108 in operations 1000 and 1002. The secure tunnels may be established using any well-known method, such as the SSL or TLS security protocols. After the tunnels are established, operations 1004-1022 are performed. The operations 1004-1022 are similar to the operations 600-618 discussed with respect to FIG. 6. As such, the operations 1004-1020 will not be discussed in great detail and reference should be made to FIG. 6 and the operations 600-618.

In the operation 1022, the webserver 110 receives an answer from the client device 108 input by the intended recipient 106. In an embodiment, the intended recipient provided the answer in response to a hint that was provided in a landing message. In an operation 1024, the webserver 110 determines if the answer provided by the client device 108 and the intended recipient is correct. For example, in an embodiment where the hint related to a previous dining experience between the sender 102 and the intended recipient 106, "Sullivan's Steakhouse" is the correct answer. In the operation 1024, the webserver 110 determines that the intended recipient has provided the correct answer. As such, the webserver 110 accesses the private security key and the secure message and decrypts the secure message using the private security key. Once the secure message is decrypted, the webserver 110 displays the secure message, where the intended recipient 106 views the secure message at the client device 108. As noted above, a secure tunnel is established with the intended recipient's device, i.e., between the webserver 110 and the client device 108, such that unauthorized third parties may not view the contents of the secure message during display of the secure message. It should be noted that while the discussion focuses on the client device 108 that is associated with the intended recipient 106, the embodiment shown with reference to FIG. 10 may be performed when the intended recipient 106 is at a device other than the client device 108. Specifically, the intended recipient 106 may be at a device other than their own device, i.e., a borrowed device.

Figure 11A:
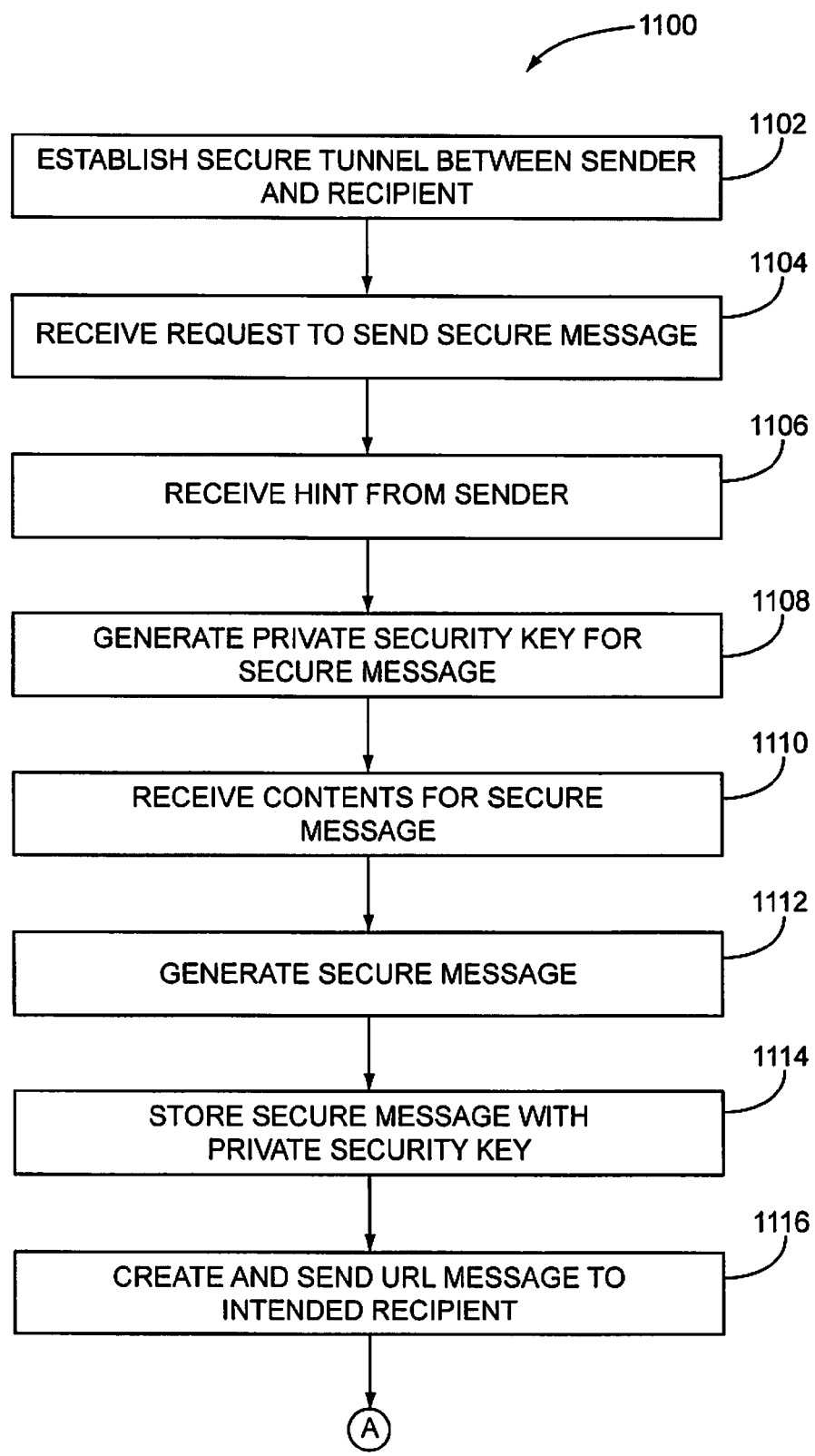
FIGS. 11A and 11B are flowcharts that illustrate a method for providing a secure message to an intended recipient as a URL message.
Figure 11B:
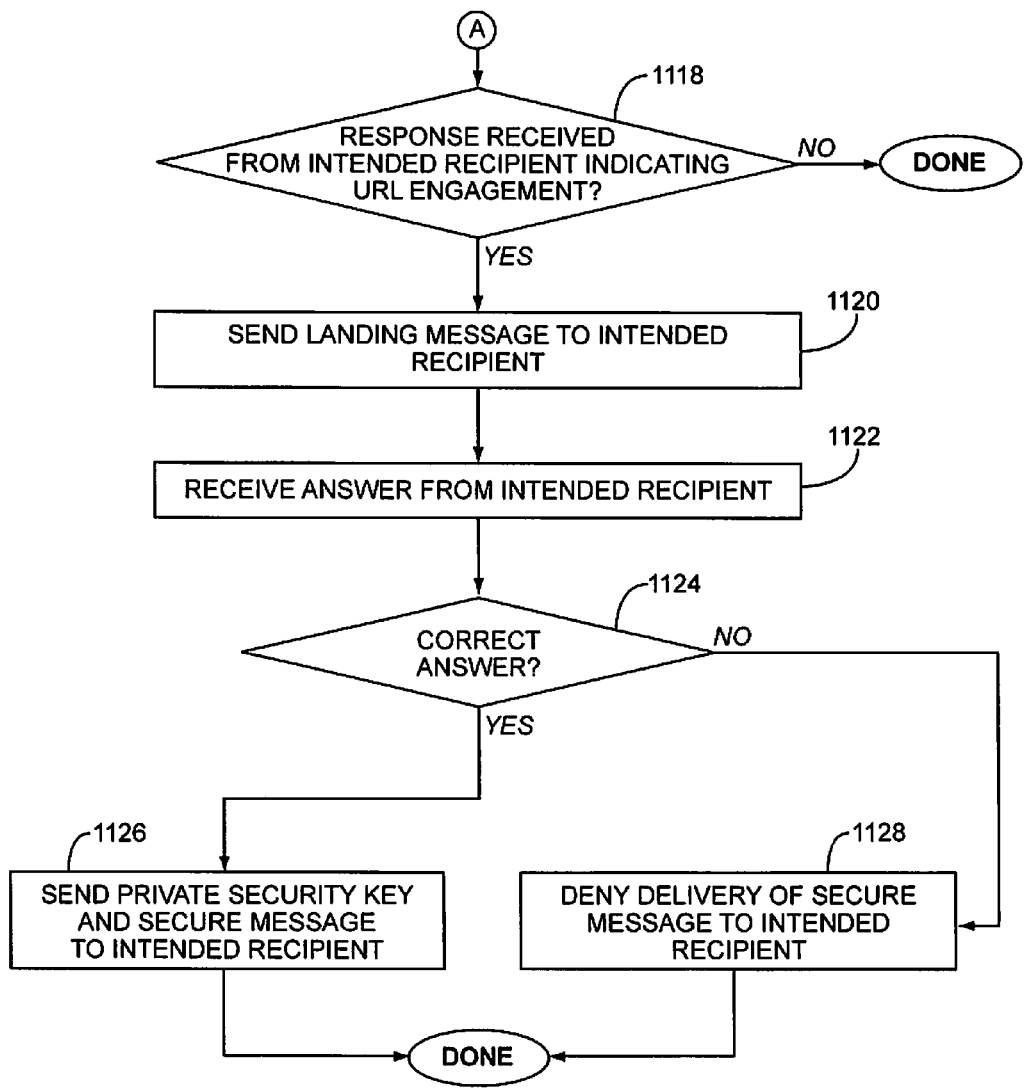

In further embodiments, the secure message along with a private security key for decrypting the secure message is provided to the intended recipient via a secure tunnel that is established between the client device associated with the sender and the client device associated with the intended recipient, as discussed with reference to FIGS. 11A and 11B. FIG. 11A illustrates a method 1100 for providing a secure message originating from a sender to an intended recipient as a URL message in accordance with an embodiment of the present invention. Initially, a secure tunnel is established between a storage device and a device that is associated with an intended recipient in an operation 1102. In one embodiment, any type of tunneling scheme may be used to establish the secure tunnel between a storage location and a device that is associated with the intended recipient. For example, a tunneling scheme in accordance with either the SSL or the TLS protocols may be used. However, the present invention is not limited to these security protocols, nor should embodiments of the present invention be considered as being limited to these security protocols.

For example, in an embodiment where the client device 104 is the storage location, a tunnel is established between the client device 104 and the client device 108 that is associated with the intended recipient 106 in accordance with the SSL protocol. In an embodiment where a webserver, such as the webserver 110, is the storage location, a tunnel is established between the webserver 110 and the client device 108 in accordance with the SSL protocol. After establishment of the secure tunnel in the operation 1102, operations 1104-1124 are performed. These operations are substantially similar to the operations 202-220 discussed with reference FIGS. 2A and 2B. Therefore, for ease of discussion, operations 1104-1122 will not be discussed.

As mentioned above, in the operation 220, which is similar to the operation 1122, an answer to a hint is received at a storage location from an intended recipient. After the storage location receives the answer, the storage location determines if the answer is correct in an operation 1124. For example, the hint related to a previous dining experience between the sender and the intended recipient and the answer was "Sullivan's Steakhouse." In this example, the storage location receives the answer "Sullivan's Steakhouse" and determines that "Sullivan's Steakhouse" is the correct answer. As noted above, in an embodiment, the correct answer to the hint corresponds to the passcode that is used to access the private security key. In response to determining that the answer is correct, the storage location accesses the private key along with the secure message and sends both to the intended recipient via the secure tunnel in an operation 1126 such that a device associated with the intended recipient decrypts the secure message with the private security key for presentation to the intended recipient. In one embodiment, both the private security key and the secure message are sent together. In a further embodiment, the private security key and the secure message are sent separately.

For example, in an embodiment where the storage location is the client device 104, the client device 104 receives an answer from the intended recipient 106 and determines that the intended recipient 106 has provided the correct answer in the operation 1124. Therefore, in the operation 1126, the client device 104 accesses the private security key and the secure message and provides both the private security key and the secure message to the intended recipient. Moreover, as noted above, the private security key is used to encrypt and decrypt the secure message, where encryption may use any type of security protocol, such as AES. In the embodiment discussed with reference to FIGS. 11A and 11B, the secure message is sent using two separate types of security simultaneously. In particular, the tunnel is established in accordance with a first security protocol, i.e., SSL, and the secure message, which travels via the secure tunnel, is encrypted using a separate and distinct security protocol, i.e., AES.

Turning back to the operation 1124, if a determination is made that the intended recipient provided the incorrect answer, the storage location denies delivery of the secure message. In alternative embodiments, the storage location may continue to resend a landing message as noted in the operation 1120 a predetermined number of times until the correct answer is received. Moreover, in alternative embodiments, if a predetermined number of wrong answers are received, the intended recipient is locked out from providing further answers.

Figure 12:
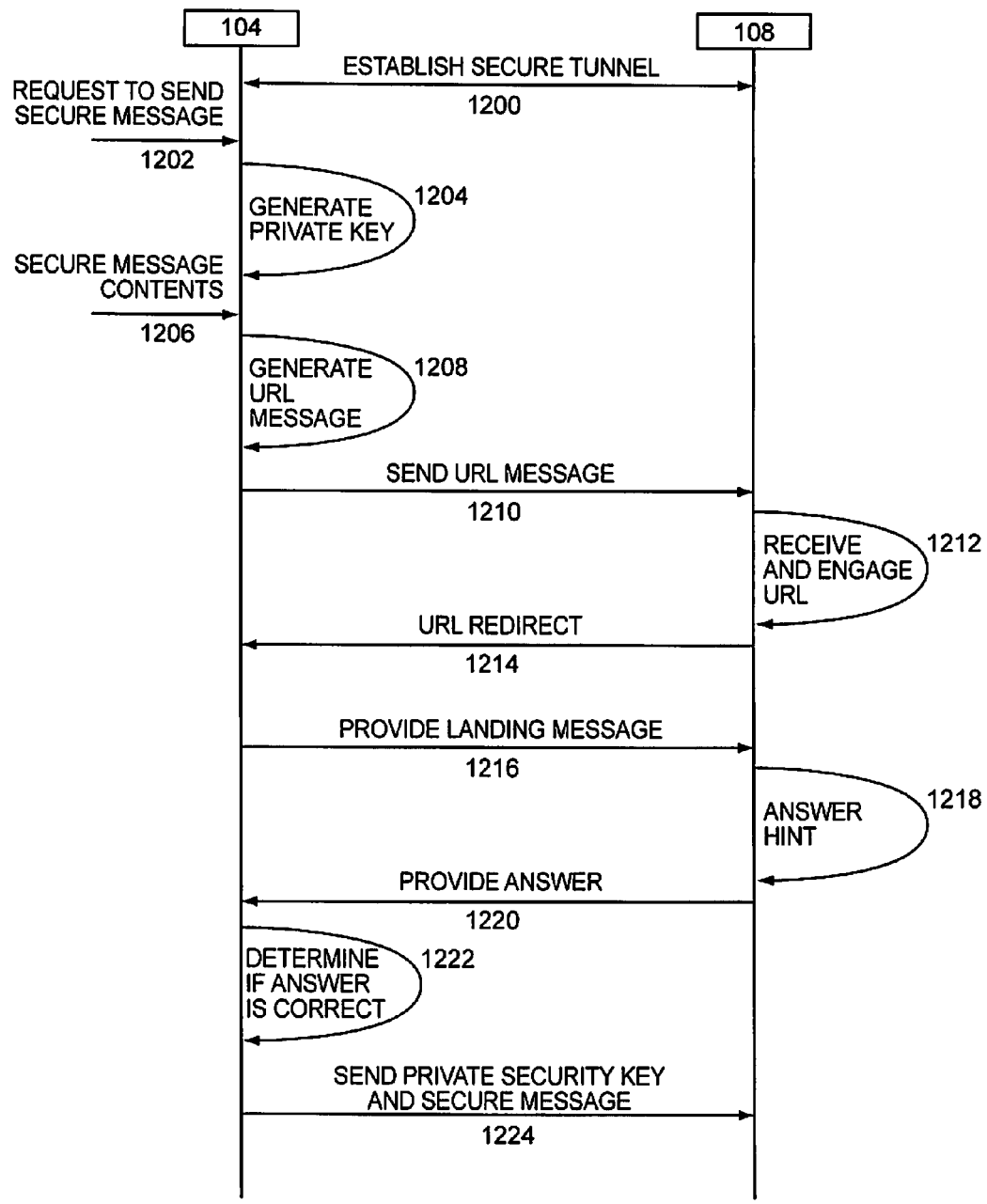
FIG. 12 illustrates a method for generating and delivering a secure message via a web service where an encrypted message for an intended recipient is converted to a URL and sent to the intended recipient in accordance with an embodiment of the present invention.

FIG. 12 illustrates a method for generating and delivering a secure message via a web service where a secure message for an intended recipient is converted to a URL and sent to the intended recipient in accordance with an embodiment of the present invention. In this embodiment, a secure message along with a private security key for the secure message is sent via a secure tunnel. Initially, in an operation 1200, a secure tunnel is established between the client device 104 and the client device 108, as described with reference to the operation 1102 and FIG. 11A. In an embodiment, the secure tunnel allows for secure communications between the client device 14 and the client device 108. After the secure tunnel is established in the operation 1200, operations 1202-1218 are performed. These operations are substantially similar to the operations 500-516 discussed with reference FIG. 5. Therefore, for ease of discussion, operations 1202-1218 will not be discussed.

In the operation 1220, the client device 108 provides an answer input from the intended recipient 106, similar to the operation 518. In response to receiving the answer in the operation 1220, the client device 104 determines if the answer is correct in an operation 1222. For example, in an embodiment the hint relates to a previous dining experience between the sender and the intended recipient. As noted above, "Sullivan's Steakhouse" is the correct answer and is the passcode.

In response to determining that the answer is correct, the client device 104 accesses the private key along with the secure message and sends the private security key along with the secure message to the client device 108 via the secure tunnel in an operation 1224. It should be noted that while the discussion focuses on the client device 108 that is associated with the intended recipient 106, the embodiment shown with reference to FIG. 12 may be performed when the intended recipient 106 is at a device other than the client device 108. Specifically, the intended recipient 106 may be at a device other than their own device, i.e., a borrowed device.

Figure 13:
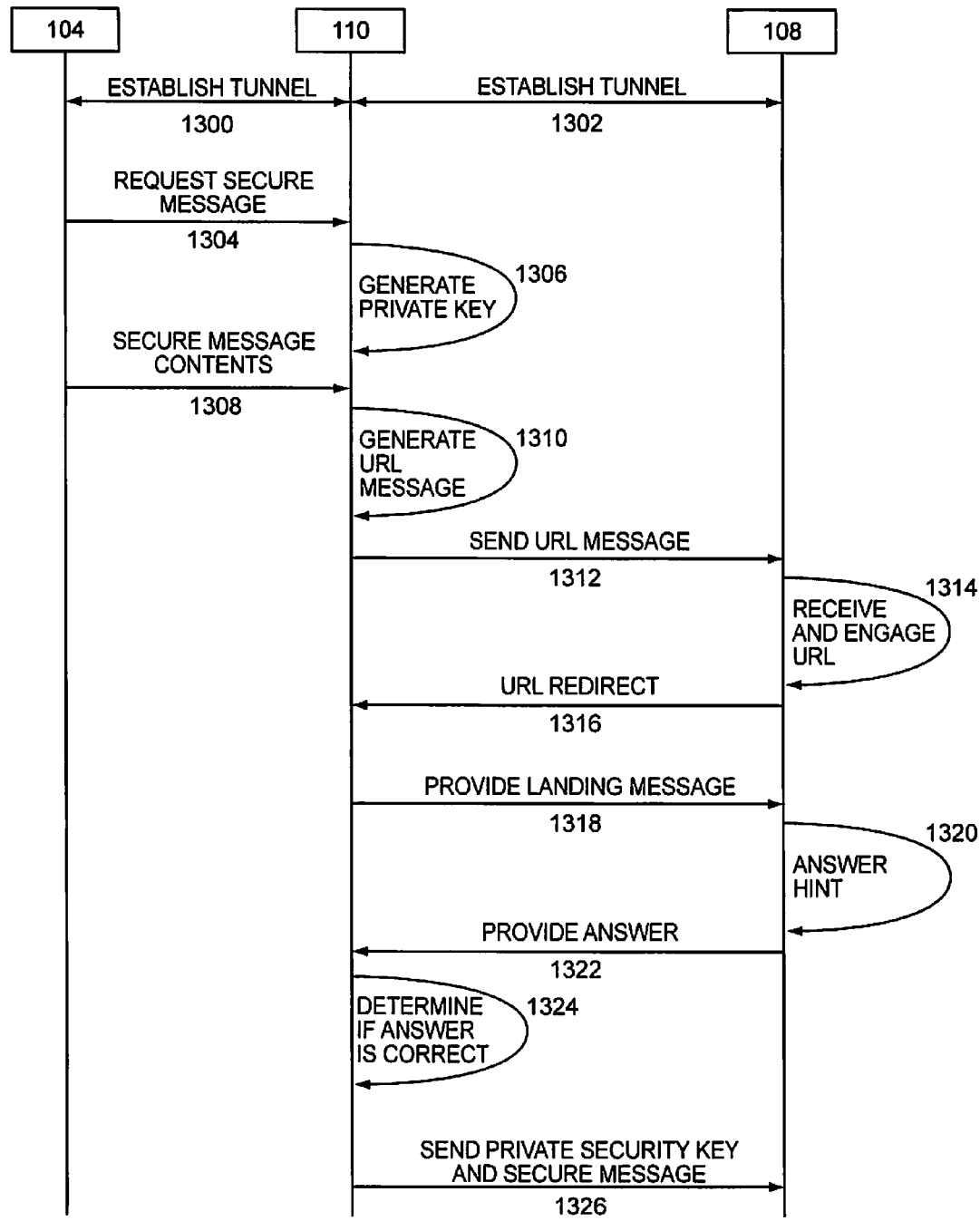
FIG. 13 illustrates a method for generating and delivering a secure message via a web service where an encrypted message for an intended recipient is converted to a URL and sent to the intended recipient in accordance with an embodiment of the present invention.

FIG. 13 illustrates a method for generating and delivering a secure message via a web service where an encrypted message for an intended recipient is converted to a URL and sent to the intended recipient in accordance with a further embodiment of the present invention. Initially, secure tunnels are established between the client device 104 and the webserver 110 and the webserver 110 and the client device 108 in operations 1300 and 1302. The secure tunnels may be established using any well-known method, such as the SSL or TLS security protocols. After the tunnels are established, operations 1304-1320 are performed. The operations 1304-1320 are similar to the operations 600-616 discussed with respect to FIG. 6. As such, the operations 1304-1320 will not be discussed and reference should be made to FIG. 6 and the operations 600-616.

In the operation 1322, the webserver 110 receives an answer from the client device 108 input by the intended recipient 106. In an embodiment, the intended recipient provided the answer in response to a hint that was provided in a landing message. In an operation 1324, the webserver 110 determines if the answer provided by the client device 108 and the intended recipient is correct. For example, in an embodiment where the hint related to a previous dining experience between the sender 102 and the intended recipient 106, "Sullivan's Steakhouse" is the correct answer. In the operation 1324, the webserver 110 determines that the intended recipient has provided the correct answer. As such, the webserver 110 accesses the private security key and the secure message and provides both the private security key and the secure message to the client device 108 in an operation 1330. In this embodiment, the private security key and the secure message are provided via the secure tunnel that was established in the operation 1302. Again, it should be noted that while the discussion focuses on the client device 108 that is associated with the intended recipient 106, the embodiment shown with reference to FIG. 13 may be performed when the intended recipient 106 is at a device other than the client device 108. Specifically, the intended recipient 106 may be at a device other than their own device, i.e., a borrowed device.

Those skilled in the art will recognize improvements and modifications to the preferred embodiments of the present disclosure. All such improvements and modifications are considered within the scope of the concepts disclosed herein and the claims that follow.

What is claimed is:

1. A computer implemented method comprising:
   establishing, at a sender's computing device, a secure tunnel with device associated with an intended recipient;

receiving, at the sender's device, a request from a sender to send a secure message to the intended recipient;

in response to receiving the request to send the secure message, generating a private security for encrypting and decrypting the secure message;

receiving contents for the secure message;

generating and encrypting the secure message after generating the private security key;

storing the private security key and the encrypted secure message;

creating, at the sender's computing device, a URL message in response to receiving the request to send the secure message to the intended recipient;

sending, from the sender's computing device, device the URL message to the intended recipient;

receiving, at the sender's computing device, a URL message response from the intended recipient;

providing, from the sender's computing device, a landing message to the intended recipient in response to receiving the URL message response, the landing message including a hint requesting an answer from the intended recipient;

receiving, at the sender's computing device, the answer from the intended recipient;

decrypting, at the sender's computing device, the secure message; and providing, at the sender's computing device, for display at the intended recipient, the decrypted secure message to the intended recipient via the secure tunnel, wherein the computing device and the device associated with the intended recipient each include first and second types of security and the secure message is sent using both the first type of security and the second type of security.

2. The computer implemented method of claim 1, wherein the hint relates to a publicly unavailable fact known between the sender and the intended recipient.

3. The computer implemented method of claim 2, wherein the answer is a passcode for the private security key.

4. The computer implemented method of claim 1, wherein the method further comprises:

accessing the private security key based on the answer; and decrypting the secure message using the private security key.

5. The computer implemented method of claim 1, wherein the URL message includes:

a URL that redirects the intended recipient to the sender's computing device storing the private security key and the secure message when the intended recipient engages the URL.

6. The computer implemented method of claim 5, wherein the URL message response is received from the intended recipient when the intended recipient engages the URL that redirects the intended recipient to the sender's computing device.

7. The computer implemented method of claim 1, wherein the secure tunnel is established using a security protocol in accordance with the Secure Socket Layer (SSL) protocol.

8. The computer implemented method of claim 1, wherein the secure tunnel is established using a security protocol in accordance with the Transport Layer Security (TLS) protocol.

9. A non-transitory computer readable medium storing software for instructing a controller of a sender's computing device to:

establish a secure tunnel with a device associated with an intended recipient;

receive a request from a sender to send a secure message to the intended recipient;

in response to receiving the request to send the secure message, generate a private security key for encrypting and decrypting the secure message;

receive contents for the secure message:

generate and encrypt the secure message after generating the private security key;

store the private security key and the encrypted secure message;

create a URL message in response to receiving the request to send the secure message to the intended recipient;

send the URL message to the intended recipient;

receive a URL message response from the intended recipient;

provide a landing message to the intended recipient in response to receiving the URL message response, the landing message including a hint requesting an answer from the intended recipient;

receive the answer from the intended recipient; and decrypt the secure message; and display the decrypted secure message to the intended recipient via the secure tunnel, wherein the computing device and the device associated with the intended recipient each include first and second types of security and the secure message is sent using both the first type of security and the second type of security.

10. The non-transitory computer readable medium of claim 9, wherein the hint relates to a publicly unavailable fact known between the sender and the intended recipient.

11. The non-transitory computer readable medium of claim 9, wherein the answer is a passcode for the private security key.

12. The non-transitory computer readable medium of claim 9, wherein the software further instructs the controller of the sender's computing device to:

access the private security key based on the answer; and decrypt the secure message using the private security key.

13. The non-transitory computer readable medium of claim 9, wherein the URL message includes:

a URL that redirects the intended recipient to the sender's computing device storing the private security key and the secure message when the intended recipient engages the URL.

14. The non-transitory computer readable medium of claim 13, wherein the URL message response is received from the intended recipient when the intended recipient engages the URL that redirects the intended recipient to the sender's computing device.

15. The non-transitory computer readable medium of claim 9, wherein the secure tunnel is established using a security protocol in accordance with the Secure Socket Layer (SSL) protocol.

16. The non-transitory computer readable medium of claim 9, wherein the secure tunnel is established using a security protocol in accordance with the Transport Layer Security (TLS) protocol.

17. A non-transitory computer readable medium storing software for instructing a controller of a sender's computing device to:

establish a secure tunnel with a device associated with an intended recipient;

receive a request from a sender to send a secure message to the intended recipient;

in response to receiving the request to send the secure message, generate a private security key for encrypting and decrypting the secure message;

receive contents for the secure message;
generate and encrypt the secure message after generating the private security key;
store the private security key and the encrypted secure message;
create a URL message in response to receiving the request to send the secure message to the intended recipient;
send the URL message to the intended recipient;
receive a URL message response from the intended recipient;
provide a landing message to the intended recipient in response to receiving the URL message response, the landing message including a hint requesting an answer from the intended recipient;
receive the answer from the intended recipient, the answer corresponding to a passcode for the private security key;
access the private security key using the passcode;
decrypt the secure message using the private security key; and
display the decrypted secure message to the intended user via the secure tunnel, wherein the computing device and the device associated with the intended recipient each include first and second types of security and the secure message is sent using both the first type of security and the second type of security.

18. The non-transitory computer readable medium of claim 17, wherein the hint relates to a publicly unavailable fact known between the sender and the intended recipient.

19. The non-transitory computer readable medium of claim 17, wherein the URL message includes:
a URL that redirects the intended recipient to the sender's computing device storing the private security key and the secure message when the intended recipient engages the URL.

20. The non-transitory computer readable medium of claim 19, wherein the URL message response is received from the intended recipient when the intended recipient engages the URL that redirects the intended recipient to the sender's computing device.

21. The non-transitory computer readable medium of claim 17, wherein the secure tunnel is established using a security protocol in accordance with the Secure Socket Layer (SSL) protocol.

22. The non-transitory computer readable medium of claim 17, wherein the secure tunnel is established using a security protocol in accordance with the Transport Layer Security (TLS) protocol.

* * * * *